United States Patent
Nashida et al.

(10) Patent No.: US 8,384,744 B2
(45) Date of Patent: Feb. 26, 2013

(54) INFORMATION PROCESSING APPARATUS AND INFORMATION PROCESSING METHOD

(75) Inventors: Tatsushi Nashida, Kanagawa (JP); Kazuhiro Hara, Tokyo (JP)

(73) Assignee: Sony Corporation, Tokyo (JP)

( * ) Notice: Subject to any disclaimer, the term of this patent is extended or adjusted under 35 U.S.C. 154(b) by 662 days.

(21) Appl. No.: 12/556,072

(22) Filed: Sep. 9, 2009

(65) Prior Publication Data
US 2010/0141680 A1  Jun. 10, 2010

(30) Foreign Application Priority Data
Sep. 12, 2008 (JP) ................................ 2008-234424

(51) Int. Cl.
*G09G 5/00* (2006.01)
*G06F 3/033* (2006.01)
(52) U.S. Cl. ........................................ 345/642; 345/173
(58) Field of Classification Search ........................ None
See application file for complete search history.

(56) References Cited

U.S. PATENT DOCUMENTS

| 4,286,289 A * | 8/1981 | Ottesen et al. ................ 348/169 |
| 4,914,624 A * | 4/1990 | Dunthorn ...................... 345/173 |
| 2010/0060896 A1* | 3/2010 | Van De Wijdeven et al. 356/448 |

FOREIGN PATENT DOCUMENTS

| JP | 261932 | 10/1995 |
| JP | 2001-356878 | 12/2001 |
| JP | 2004-213312 | 7/2004 |
| JP | 2004-310334 | 11/2004 |
| JP | 2005-322088 | 11/2005 |
| JP | 2006-260575 | 9/2006 |
| JP | 2007-128497 | 5/2007 |

* cited by examiner

*Primary Examiner* — K. Wong
(74) *Attorney, Agent, or Firm* — Finnegan, Henderson, Farabow, Garrett & Dunner, LLP

(57) ABSTRACT

There is provided an information processing apparatus including: a display panel for displaying a plurality of objects; an area region detection unit for detecting an operation body positioned on the display panel, and detecting an area region of the display panel corresponding to the operation body; a contacting object detection unit for detecting one or a plurality of objects contacting the area region detected by the area region detection unit; and an object selection unit for setting part of or all of the objects detected by the contacting object detection unit to a selected state.

25 Claims, 13 Drawing Sheets

MOVEMENT OF OPERATION BODY

CHANGE IN AREA REGION

CHANGE IN ATATE OF OBJECT

INFORMATION PROCESSING APPARATUS AND INFORMATION PROCESSING METHOD

BACKGROUND OF THE INVENTION

1. Field of the Invention

The present invention relates to an information processing apparatus and an information processing method.

2. Description of the Related Art

In recent years, a portable information processing apparatus equipped with a touch panel, a touch pad, and the like (hereinafter referred to as touch panel) has been widely used. Such portable information processing apparatus includes portable telephone, PHS (Personal Handy-phone System), portable moving image player, portable music player, PDA (Personal Digital Assistant), and the like. Recently, the touch panel is also being mounted on a television receiver, a portable game machine, and a remote controller. Some information processing apparatuses do not have an operation means other than the touch panel. The user using such information processing apparatus performs substantially all operations using the touch panel.

Therefore, with widespread use of the touch panel, improvement in the operation body system using the touch panel has been desired with extension of the usage mode. The user normally performs a predetermined operation by moving the finger, the stylus, and the like while pressing the surface of the touch panel with the finger, the stylus and the like. When such operation is performed, the touch panel reads the pressed point as a coordinate. The coordinate read from the touch panel is transmitted to a calculation processing means, and a predetermined process is executed. Japanese Patent Application Laid-Open No. 2004-213312 discloses configuration of a resistive analog touch panel.

SUMMARY OF THE INVENTION

However, the position where the user touches with the finger, the stylus, and the like is recognized as a coordinate of one point in the past touch panel. Thus, it is difficult to simultaneously operate a plurality of objects when the plurality of objects is being displayed in a display region of the touch panel. Even if a touch panel that can simultaneously recognize a plurality of positions pressed using a plurality of fingers, styluses, and the like (hereinafter referred to as operation body) is used, only the object worth the number of operation bodies can be operated. That is, the number of objects the user can operate with five fingers is limited to five.

The present invention addresses the above-identified, and other issues associated with conventional methods and apparatuses, and it is desirable to provide a new and improved information processing apparatus capable of simultaneously operating objects more than the number of operation bodies, and an information processing method.

In order to solve the above issue, according to an embodiment of the present invention, there is provided an information processing apparatus including: a display panel for displaying a plurality of objects; an area region detection unit for detecting an operation body positioned on the display panel, and detecting an area region of the display panel corresponding to the operation body; a contacting object detection unit for detecting one or a plurality of objects contacting the area region detected by the area region detection unit; and an object selection unit for setting part of or all of the objects detected by the contacting object detection unit to a selected state.

The information processing apparatus may further include an object movement unit for moving the object set to the selected state by the object selection unit in accordance with movement of the area region corresponding to the operation body when the operation body is moved.

The contacting object detection unit may be configured to detect the object contacting the area region during the movement of the operation body, and the object selection unit may be configured to set the object detected by the contacting object detection unit during the movement of the operation body to the selected state.

The object selection unit may be configured to set only an object having the same attribute as the object detected first by the contacting object detection unit of the objects detected by the contacting object detection unit to the selected state.

The information processing apparatus may further include an object alignment unit for, when an attribute indicating a predetermined order is given to the object, aligning the objects selected by the object selection unit according to the order indicated by the attribute.

The area region detection unit may be configured to represent the area region with a coordinate of one point when a size of the area region corresponding to the operation body is smaller than a predetermined value.

The area region detection unit may be configured to detect a plurality of operation bodies positioned on the display panel, and detects one or a plurality of area regions corresponding to the plurality of operation bodies.

The object movement unit may be configured to move, when a shape of the area region is changed during the movement of the operation body, the object such that a contacting state of the object is maintained in the area region after the change.

The information processing apparatus may further include an object alignment unit for aligning the objects selected by the object selection unit according to an order selected by the object selection unit.

In order to solve the above issue, according to another embodiment of the present invention, there is provided an information processing method including the steps of: displaying a plurality of objects on a display panel; detecting an operation body positioned on the display panel and an area region of the display panel corresponding to the operation body; detecting one or a plurality of objects contacting the area region detected in the area region detection step; and setting part of or all of the objects detected in the contact object detection step to a selected state.

In order to solve the above issue, according to another embodiment of the present invention, there can be provided a program for causing a computer to realize the functions of the information processing apparatus. There is also provided a computer readable recording medium recorded with such program.

According to the embodiments of the present invention described above, objects of greater number than the number of operation bodies can be simultaneously operated when operating the objects using a touch panel.

DETAILED DESCRIPTION OF THE PREFERRED EMBODIMENTS

Figure 1:
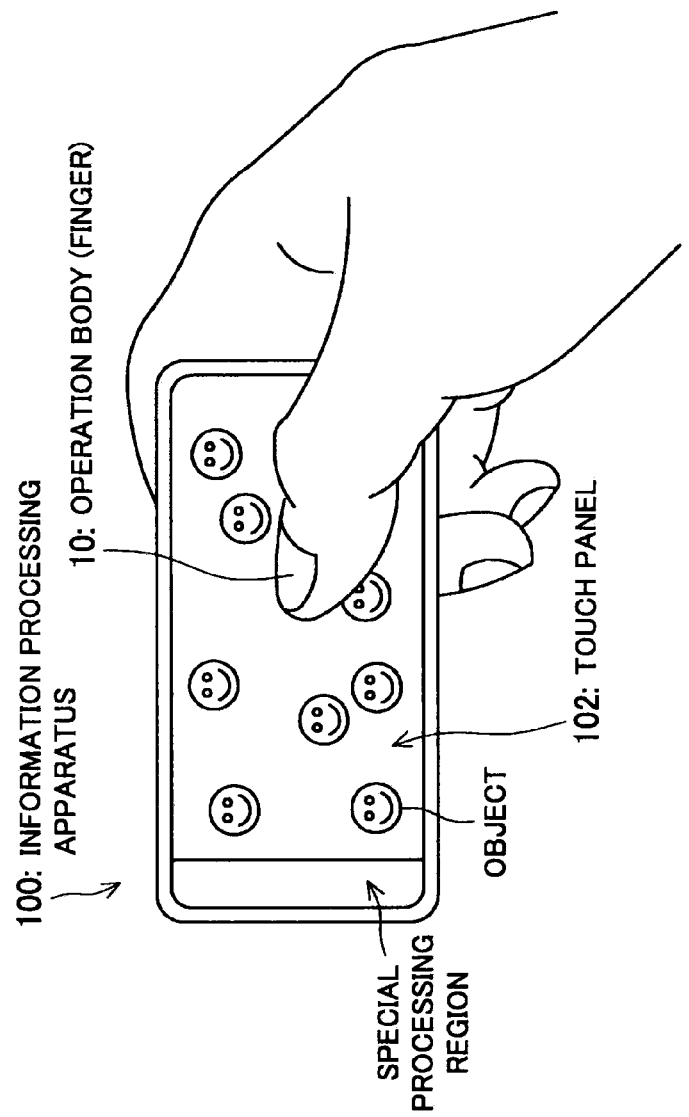
FIG. 1 shows an outer appearance of an information processing apparatus according to one embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Regarding Flow of Description]

The flow of description related to the embodiment of the present invention described below will be briefly described. First, the overall configuration of the information processing apparatus according to one embodiment of the present invention will be described with reference to FIG. 1. Then, the overall configuration of the information processing apparatus according to one variant of the embodiment will be described with reference to FIG. 2. Thereafter, the issues to be solved by the apparatus and the method according to the embodiment will be briefly described with reference to FIG. 3.

The function configuration of the information processing apparatus according to the embodiment will then be described with reference to FIG. 4. The information processing method according to the embodiment will be described with reference to FIGS. 5 to 12. The hardware configuration of the information processing apparatus according to the embodiment will be described with reference to FIG. 13. Lastly, the technical idea of the embodiment will be summarized and the effects obtained from such technical idea will be briefly described.

<Embodiment>

One embodiment of the present invention will be described. The present embodiment relates to a technique allowing the object of greater number than the number of operation bodies to be simultaneously operated when the object is operated using a touch panel capable of recognizing a contacting portion of the operation body by a plane. A touch panel that can recognize the portion to which the operation body is proximate as a plane region even if the operation body does not directly contact the touch panel exists. The technique of the present embodiment is suitably used on such touch panel. In the following description, a case where the operation body is contacted to the touch panel will be described by way of example, for the sake of convenience of the explanation.

[Overall Configuration of Information Processing Apparatus 100]

First, the overall configuration of the information processing apparatus 100 according to the present embodiment will be described with reference to FIG. 1. FIG. 1 is an explanatory view showing an outer appearance of the information processing apparatus 100 according to the present embodiment.

As shown in FIG. 1, the information processing apparatus 100 is arranged with a touch panel 102. A plurality of objects is displayed on the touch panel 102. The touch panel 102 is formed with a specific processing region, so that when the object is moved to the specific processing region, a predetermined process corresponding to the moved object is executed.

For instance, if the object indicates music data and the specific processing region corresponds to the reproduction process of the music data, the music data corresponding to the object is reproduced when the object is moved to the specific processing region. Similarly, if the object corresponds to image data and the specific processing region corresponds to a displaying process of the image data, the displaying process of the image data is executed when the object is moved to the specific processing region. The type of data corresponded to the object may be text data, moving image data, e-mail data, Web address, and the like other than the music data and the image data.

Thus, various types of data are corresponded to the object. The type of processing executed when the object is moved to the specific processing region also differs depending on the type of data. For instance, the process corresponding to the text data includes display of text, attachment to e-mail, deletion and compression of data, and activation of edit application. The process corresponding to the Web address includes activation of Web browser, displaying of homepage by the activated Web browser, and reproduction of moving image data on the server indicated by the web address. When a plurality of image data is moved to the specific processing region, an image display application is activated and the plurality of image data are displayed all at once.

In order to execute a predetermined process, the user selects the object displayed on the touch panel 102 and moves the relevant object to the specific processing region. A sensor for detecting the position where an operation body 10 contacted is built in the couth panel 102, so that the object is selected when the contacting position of the operation body 10 and the position of the object match. When the operation body 10 contacted to the object is moved, the information processing apparatus 100 detects the movement of the operation body 10, and moves the object in accordance with the movement of the operation body 10. Thus, the object is selected by the contacting operation of the operation body 10, and the object is moved by the movement of the operation body 10.

However, the selecting operation and the moving operation are automatically executed by the information processing apparatus 100. The user merely slides the object in a desired moving direction while contacting the operation body 10 to the touch panel 102. In this case, the user slides the operation body 10 while paying attention to only the moving operation, and does not particularly pay attention to the operation of selecting the object. That is, the selecting operation of the object is carried out in the natural transition of moving the object by the user.

The information processing apparatus 100 does not execute only the process of selecting and moving the object with respect to the contact and the movement of the operation body 10. For instance, if the operation body 10 is moved drawing a predetermined path while contacting the touch panel 102, the information processing apparatus 100 executes a predetermined process corresponding to the path drawn by the operation body 10. That is, the information processing apparatus 100 has a gesture input function. For instance, when a predetermined gesture is input, the application corresponded to the relevant gesture is activated or a predetermined process corresponded to the relevant gesture is executed.

The finger of the user and the like may be used as the operation body 10. A stylus, a touch pen, and the like may also be used as the operation body 10. If the touch panel 102 is an optical type, an arbitrary object may be used as the operation body 10. For instance, if the touch panel 102 is an optical type, a soft tool such as a brush that is difficult to press the touch panel 102 can be used as the operation body 10. Furthermore, if the touch panel 102 is an In-Cell optical touch panel, any object may be used as the operation body 10 as long as a shade appears in the touch panel 102.

The In-Cell optical touch panel will be briefly described below. The optical touch panel has various types. An optical touch panel of a type in which an optical sensor is arranged at the outer frame of a liquid crystal panel configuring a liquid crystal display, and the position and the moving direction of the operation body 10 that contacted the liquid crystal panel is detected by the optical sensor is relatively well known. Different from such type, the In-Cell optical touch panel has an optical sensor array mounted on the liquid crystal panel, and includes a mechanism for detecting the position and the moving direction of the operation body that contacted or approached the liquid crystal panel with the optical sensor array.

More specifically, an optical sensor and a lead circuit are formed on a glass substrate of the optical touch panel, where light entering from the outside is detected by the optical sensor and the intensity thereof is read out by the lead circuit to recognize the shade of the operation body 10. In the In-Cell optical touch panel, the shape, the contacting area, and the like of the operation body 10 can be recognized based on the shade of the operation body 10. Thus, the operation by the contacting "area", which is assumed to be difficult with other optical touch panel, can be realized. Furthermore, if the In-Cell optical touch panel is applied, merits such as enhancement of recognition accuracy and enhancement of display quality, and enhancement in designability in the liquid crystal display and the like on which it is mounted are obtained.

Figure 2:
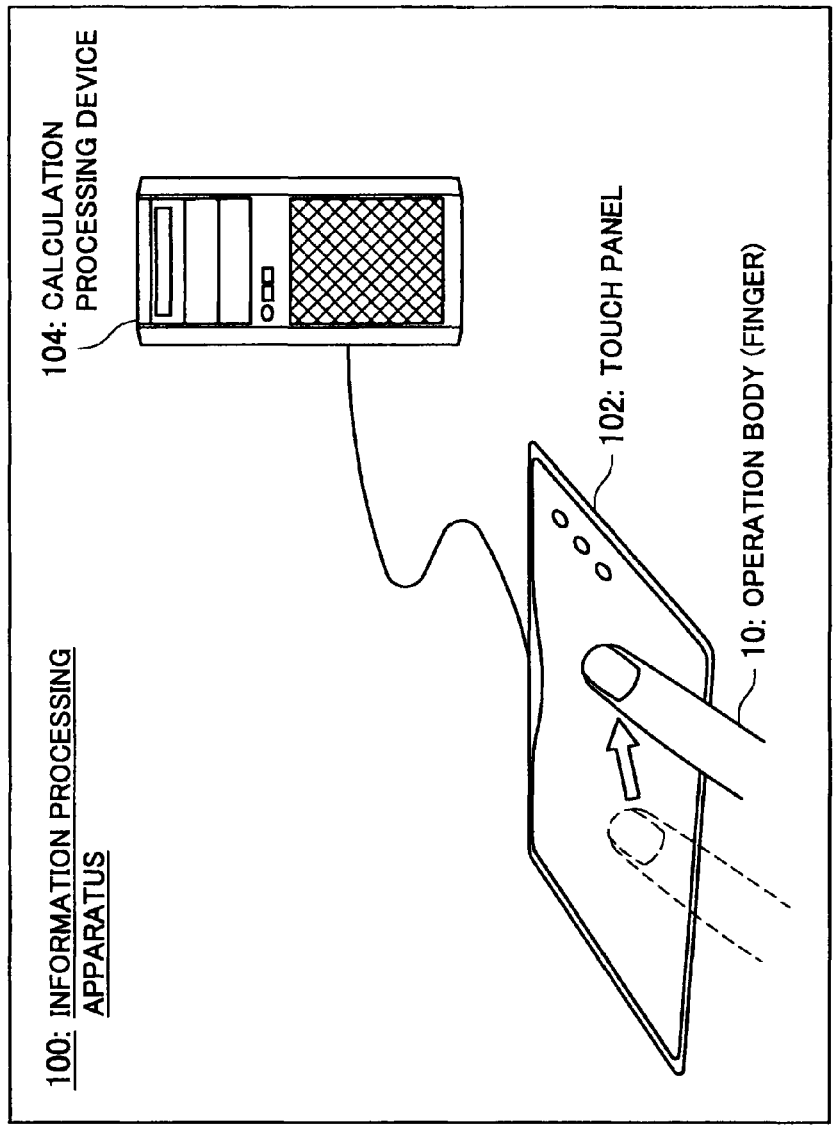
FIG. 2 shows an outer appearance of an information processing apparatus according to one embodiment of the present invention.

The object of the present embodiment is to realize an operation body system having high convenience using the touch panel 102 where operation by the contacting "area" is possible as in the In-Cell optical touch panel. The configuration of the information processing apparatus 100 mounted with the touch panel 102 may be changed as in FIG. 2. In the example of FIG. 2, the touch panel 102 configuring the information processing apparatus 100 and a calculation processing device 104 for processing the position information and the like of the operation body 10 detected by the touch panel 102 are configured as separate bodies. In this configuration example, the movement process of the object and the processing of data that occurs with the movement of the object are executed by the calculation processing device 104. Thus, the configuration of the information processing apparatus 100 can be freely modified according to the mode of implementation.

(Organization of Issues)

As described above, the present embodiment relates to the information processing apparatus 100 amounted with the touch panel 102 in which operation by the contacting "area" can be performed. The information processing apparatus 100 and the information processing method according to the present embodiment will be specifically described below, but the issues to be solved by the present embodiment will be briefly organized prior to such description.

Figure 3:
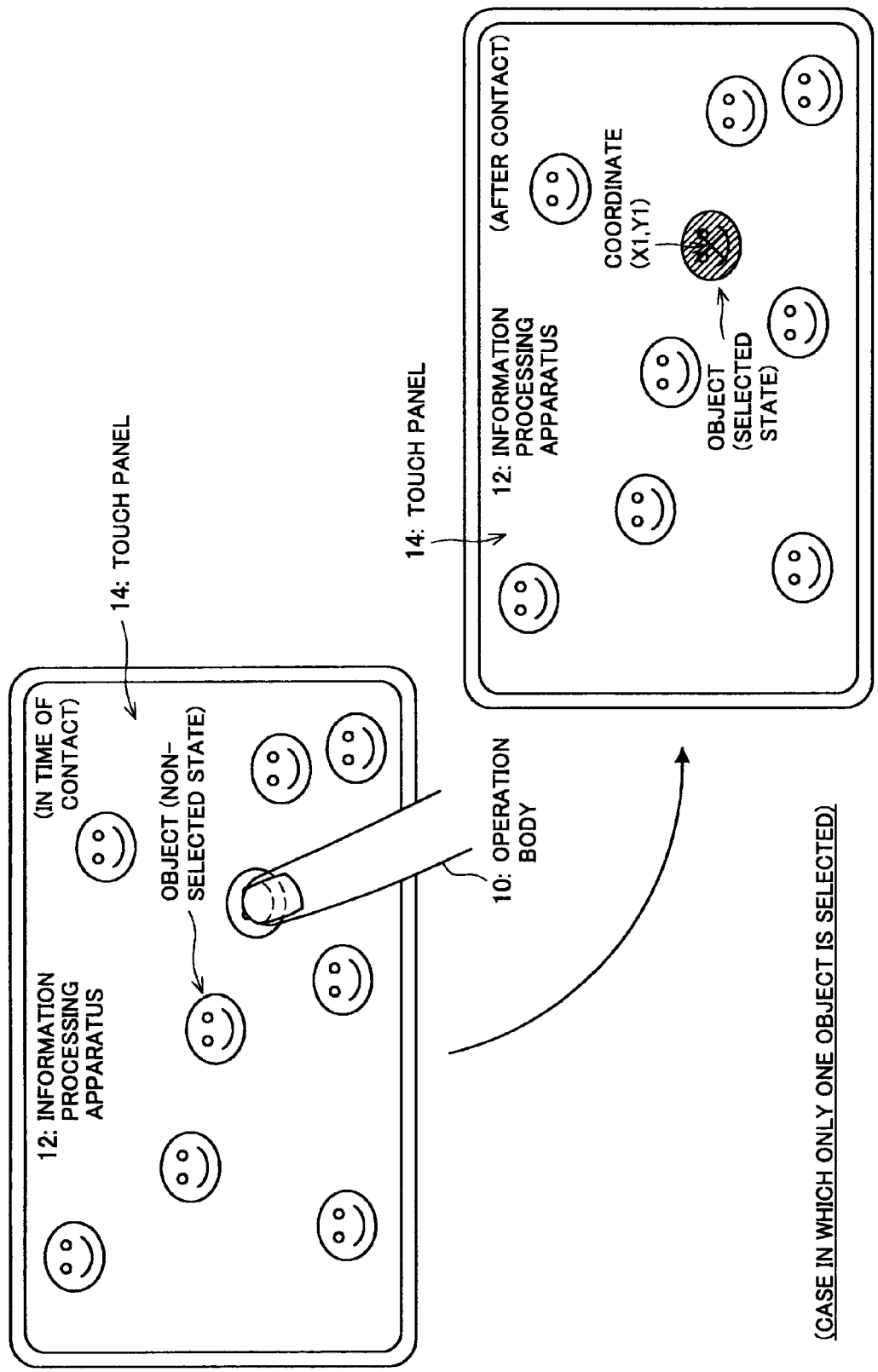
FIG. 3 shows an example of an information processing method.

First, the operation body system of the general information processing apparatus 12 will be described with reference to FIG. 3. FIG. 3 is an explanatory view for describing the operation body system of the general information processing apparatus 12. The information processing apparatus 12 is mounted with the touch panel 14 that does not respond to the operation by the contacting "area". Such touch panel 14 recognizes the position contacted by the operation body 10 as the coordinate of one point. Thus, only one point on the touch panel 14 is selected even if the touch panel 14 is pressed by the operation body 10 having a finite area.

For example, when the object is selected with the operation body 10 by the user as shown in FIG. 3, the coordinate of one point indicating the position of the operation body 10 is detected by the touch panel 14. In this case, if the coordinate (e.g., (coordinate (X1, Y1)) of one point detected by the touch panel 14 is overlapping the object, the information processing apparatus 12 sets the relevant object in the selected state. If the operation body 10 is moved, the information processing apparatus 12 moves the object in accordance with the movement of the contacting position of the operation body 10.

The position of the operation body 10 is thus recognized as one coordinate point. The user thus can operate only one object for one operation body 10. For instance, when gripping the housing of the information processing apparatus 12 with one hand and operating the object with the other hand, five or more objects are not simultaneously operated as the user can use only five fingers. As a result, it is difficult to select a great number of contents all at once or to process the contents all at once.

With respect to such difficulty, a method of selecting a plurality of objects one at a time to be in a selected state, and simultaneously operating the plurality of objects in the selected state is considered. However, a first operation step of setting a plurality of objects to the selected state, and a second operation step of operating the objects in the selected state increase the operation steps. In the first operation step, the user sets one object to the selected state, once releases the finger from the touch panel 14, and contacts the finger to the touch panel 14 to again set another object to the selected state. The user repeats such operation, and performs the second operation step after all the desired objects are in the selected state. However, it is very inconvenient to perform the operation after setting each object to the selected state through such operation.

Many touch panels 14 mounted on the compact information processing apparatus 12 have a small size. In such case, the size of the object displayed on the touch panel 14 obviously becomes small. It is very hard to select the object of small size one at a time by the operation described above. In particular, if a plurality of objects is displayed in an overlapping manner, the desired objects may not be selected unless carefully operated using a fine-tipped stylus. Thus, when operating a plurality of objects all at once, an operation body system in which the number of operation step is few and the objects may not be selected one at a time is desired. The object of the present embodiment is to realize such operation body system.

The function configuration of the information processing apparatus 100 capable of achieving such object will be described below.

[Function Configuration of Information Processing Apparatus 100]

The function configuration of the information processing apparatus 100 according to the present embodiment will be described with reference to FIG. 4. FIG. 4 is an explanatory view showing a function configuration example of the information processing apparatus 100 according to the present embodiment.

Figure 4:
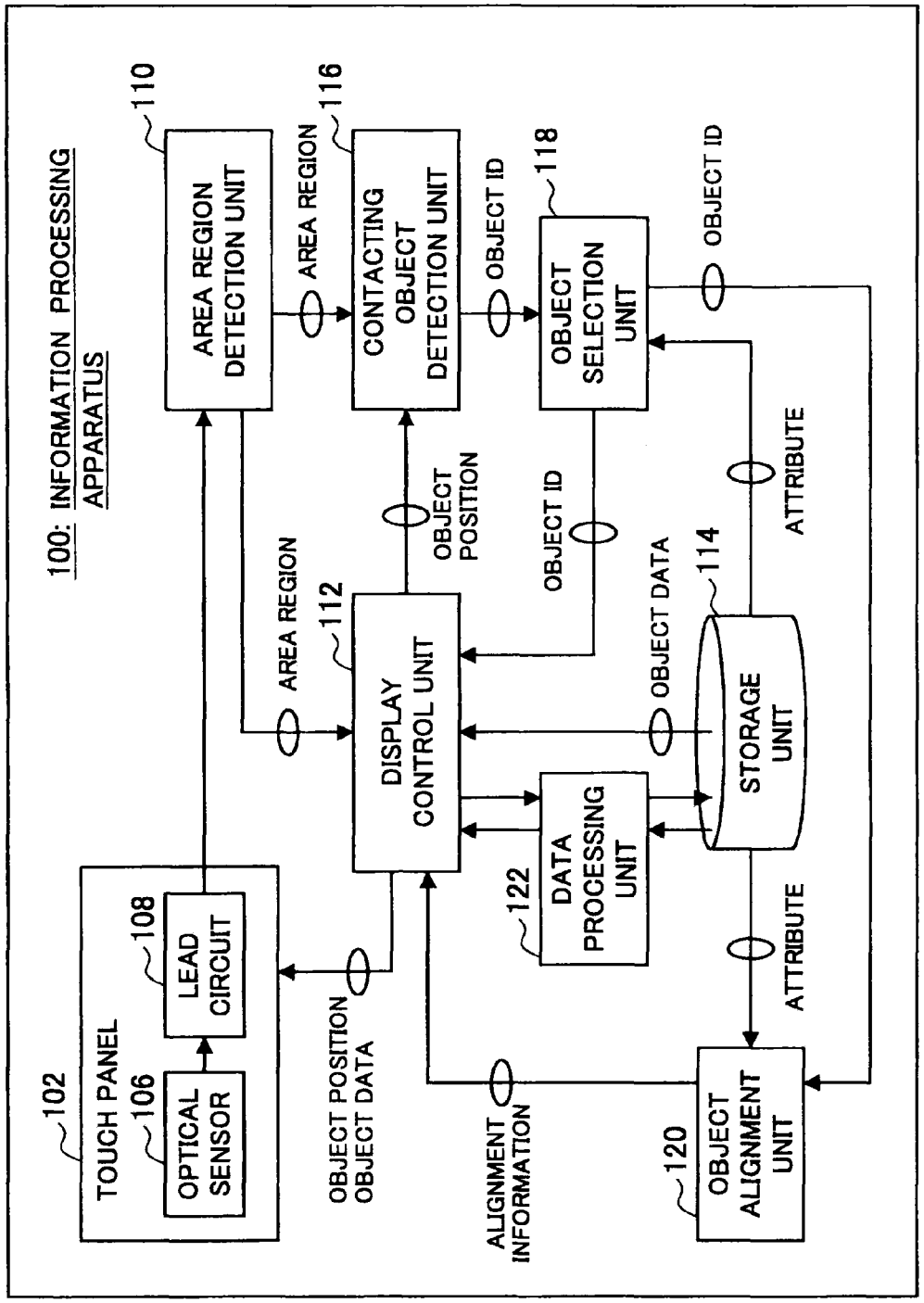
FIG. 4 shows a function configuration example of an information processing apparatus according to one embodiment of the present invention.

As shown in FIG. 4, the information processing apparatus 100 is mainly configured by the touch panel 102, an area region detection unit 110, a display control unit 112, a storage unit 114, a contacting object detection unit 116, an object selection unit 118, an object alignment unit 120, and a data processing unit 122.

(Touch Panel 102)

The touch panel 102 has a display function of displaying various images including objects, and a sensor function of detecting the contacting portion of the operation body 10 contacted to the screen. The display function of the touch panel 102 includes, for example, a function of displaying object data input from the display control unit 112, to be hereinafter described. In this case, the touch panel 102 displays the object data based on the position information of the object input with the object data from the display control unit 112. With regards to the sensor function of the touch panel 102, a mechanism for recognizing the contacting portion of the operation body 10 as an "area" region is mounted, as described above.

As shown in FIG. 4, the touch panel 102 includes an optical sensor 106 and a lead circuit 108. The optical sensor 106 detects the intensity of light entered from outside the touch panel 102. The lead circuit 108 reads out the intensity of light detected by the optical sensor 106 to detect the shade of the operation body 10. For instance, when the operation body 10 contacts the touch panel 102, the shade of the operation body 10 is projected on the touch panel 102. The projected shade of the operation body 10 is detected by the optical sensor 106. The shade detected by the optical sensor 106 is read out by the lead circuit 108. The information read out by the lead circuit 108 includes position, shape, and the like of the shade (hereinafter referred to as shade data). Such shade data is input from the lead circuit 108 to the area region detection unit 110.

(Area Region Detection Unit 110)

The area region detection unit 110 detects the area region corresponding to the operation body 10 based on the shade data input from the lead circuit 108 of the touch panel 102. For instance, when the operation body 10 is contacted to the touch panel 102, the portion where the operation body 10 and the touch panel are directly contacted and the portion close thereto at smaller than or equal to a predetermined distance are detected as the shade, and the shade data is input to the area region detection unit 110. The shade data includes set of coordinates in which the outside light luminance is lower than a predetermined value due to the shade of the operation body 10. The area region detection unit 110 references the shade data to detect a cluster of continuous coordinates. Regarding the continuity between the coordinates, determination may be made that the coordinates are continuous when the distance between the coordinates is smaller than or equal to a predetermined distance. The cluster of coordinates detected by the area region detection unit 110 is recognized as the area region corresponding to the operation body 10. The information of the area region is input from the area region detection unit 110 to the display control unit 112 and the contacting object detection unit 116.

(Display Control Unit 112)

The display control unit 112 is a control means for controlling the content to be displayed on the touch panel 102. For instance, the display control unit 112 reads out the object data recorded in the storage unit 114, to be hereinafter described, and displays the same on the touch panel 102. In this case, the display control unit 112 specifies the display position of the object with respect to the touch panel 102, and displays the object data at the display position. Thus, the display control unit 112 holds information indicating the display position of the object to be displayed on the touch panel 102. The information indicating the display position of the object is input from the display control unit 112 to the contacting object detection unit 116.

The information of the area region is input from the area region detection unit 110 to the display control unit 112. For instance, if the operation body 10 contacting the touch panel 102 is moved, the information of the area region is input in real time from the area region detection unit 110 to the display control unit 112. The information of the object in the selected state is also input from the object selection unit 118, to be hereinafter described. For instance, if the object in the selected state exists, the display control unit 112 updates the display position of the object in the selected state with respect to the touch panel 102 every time the information of the area region is updated. As a result, the object in the selected state is displayed on the touch panel 102 as if moving following the operation body 10.

(Storage Unit 114)

The storage unit 114 stores the object data to be displayed on the touch panel 102. The object data referred herein includes arbitrary parts configuring graphical user interface (hereinafter referred to as GUI) such as icon, button, and thumbnail. The storage unit 114 also stores attribute information in correspondence to each object data. The attribute information includes created data and time of the object data or the entity data, updated date and time, name of creator, name of updater, type of entity data, size of entity data, degree of importance, priority, and the like.

The storage unit 114 also stores the entity data corresponding to the object data in correspondence to each other. The entity data referred herein is data corresponding to a predetermined process that is executed when the object displayed on the touch panel 102 is operated. For instance, the object data corresponding to the image data has the image data corresponded as the entity data. The storage unit 114 also stores an image display application for displaying the image data in correspondence to the object data, the image data, or the attribute information.

The object data stored in the storage unit 114 is read out by the display control unit 112 and displayed on the touch panel 102. The attribute information is used when setting the object read out by the object selection unit 118, to be hereinafter described, in the selected state. The attribute information is also used when generating alignment information of the object by being read by the object alignment unit 120, to be hereinafter described. The entity data stored in the storage unit 114 is read out by the data processing unit 122, to be hereinafter described, and used for the predetermined data processing.

(Contacting Object Detection Unit 116)

As described above, the contacting object detection unit 116 is input with the information of the area region from the area region detection unit 110. Furthermore, the contacting object detection unit 116 is input with the information indicating the display position of the object from the display control unit 112. The contacting object detection unit 116 thus compares the area region indicated by the information input from the area region detection unit 110 and the display position of the object input from the display control unit 112. The contacting object detection unit 116 then detects the object which display position is included in the relevant area region.

The information of the object (hereinafter referred to as object ID) detected by the contacting object detection unit 116 is input to the object selection unit 118. The information of the object (hereinafter referred to as key object) that contacted the area region first is notified from the contacting object detection unit 116 to the object selection unit 118. The objected contacted the "first" is the object that contacted the area region corresponding to the operation body 10 the first from when the operation body 10 contacted the touch panel 102 until the operation body 10 is separated from the touch panel 102. However, it also refers to an object, which when a predetermined condition is imposed, contacted the first under the relevant condition.

(Object Selection Unit 118)

The object selection unit 118 determines the object to have in the selected state based on the object ID input from the contacting object detection unit 116 and the attribute information read out from the storage unit 114. First, the object selection unit 118 reads out from the storage unit 114 the attribute information corresponded to the object data specified by the object ID input from the contacting object detection unit 116.

If the object ID of the key object is input from the contracting object detection unit 116, the object selection unit 118 reads out the attribute information of the key object from the storage unit 114. The object selection unit 118 then extracts the object having attribute information same as the attribute information of the key object, and determines such objects as the objects to have in the selected state. For instance, if the entity data corresponding to the key object is image data, the type of data is referenced as the attribute information by the object selection unit 118, and the object corresponded to the image data is determined as the object to have in the selected state.

If the object ID of the key object is not input from the contacting object detection unit 116, the object selection unit 118 determines all objects corresponding to the object ID input from the contacting object detection unit 116 as the objects to have in the selected state. In this case, the object selection unit 118 can determine the object to have in the selected state without reading out the attribute information from the storage unit 114.

The object ID of the object to have in the selected state is input from the object selection unit 118 to the display control unit 112. The object on the touch panel 102 corresponding to the object ID input to the display control unit 112 is changed to the object data of the selected state by the display control unit 112. Furthermore, the object ID indicating the object of the selected state is also input to the data processing unit 112, to be hereinafter described, via the display control unit 112, and is also referenced when processing the entity data. The object ID indicating the object of the selected state is also input from the object selection unit 118 to the object alignment unit 120.

(Object Alignment Unit 120)

The object alignment unit 120 reads out the attribute information of the object corresponding to the object ID input from the object selection unit 118 from the storage unit 114. The object alignment unit 120 generates alignment information for aligning the object in the selected state based on the attribute information read out from the storage unit 114. For instance, the object alignment unit 120 references the "Created date and time of entity data" contained in the attribute information to generate the alignment information in which the object IDs are described in the order of recent created date and time. The method of representing the attribute information is not limited to such example, and the alignment order of the object may merely be indicated in the attribute information.

The alignment information generated by the object alignment unit 120 is input to the display control unit 112. When the alignment information is input to the display control unit 112, the objects in the selected state displayed on the touch panel 102 are aligned by the display control unit 112 based on such alignment information. For instance, the objects in the selected state are automatically aligned in the order of recent "created date and time of entity data" along the longitudinal direction with the distal end of the area region corresponding to the operation body 10 as the starting point.

(Data Processing Unit 122)

The data processing unit 122 is means for processing the entity data. As described above, the data processing unit 122 is input with the object ID of the object to be in the selected state from the object selection unit 118 via the display control unit 112. The data processing unit 122 is also input with information of the area region from the area region detection unit 110 via the display control unit 112. Furthermore, the data processing unit 122 is input with the information indicating the display position of the object displayed on the touch panel 102 from the display control unit 112. The data processing unit 122 can read out the object data, the attribute information, the entity data, and the like from the storage unit 114.

Thus, the data processing unit 122 can recognize the selected state of the object displayed on the touch panel 102. The data processing unit 122 can also recognize the movement and the change of the area region corresponding to the operation body 10. The data processing unit 122 thus can recognize the operation performed on the object in the selected state. When a predetermined operation is performed on the object in the selected state, the data processing unit 122 reads out the entity data corresponding to the object performed with the predetermined operation, and executes a predetermined process using the entity data. When the selected state of the object is changed by executing the predetermined process, the data processing unit 122 records the information indicating the selected state of after the change in the storage unit 114.

For instance, as shown in FIG. 1, when the object corresponding to the music data is operated and moved to the specific processing region, the data processing unit 122 reads out the music data from the storage unit 114 and reproduces the music data. In this case, the data processing unit 122 activates the music reproduction application for reproducing the music data, and reproduces the music data read out from the storage unit 114. When the object corresponding to the Web address is operated and moved to the specific processing region, the data processing unit 122 activates the Web browser and displays the homepage and the like corresponding to the Web address. When a plurality of objects corresponding to the image data is moved to the specific processing region, the data processing unit 122 activates the image display application, and reads out a plurality of image data corresponding to the plurality of objects from the storage unit 114 and displays the same all at once.

As described above, the information processing apparatus 100 according to the present embodiment is configured to detect the area region corresponding to the shade of the operation body 10 and operate a plurality of objects all at once using such area region. In order to enhance the convenience of when operating a great amount of objects all at once or when operating a plurality of small objects, a function of discriminating or aligning the objects is mounted in the information processing apparatus 100. In particular, the discriminating function and the alignment function according to the present embodiment do not require a separate key operation or special operation and can be realized during the movement operation of the object. Thus, the user does not repeat the operation of separating or contacting the operation body 10 with respect to the touch panel 102 for discrimination and alignment. As a result, the operation body system of very high convenience can be realized.

[Information Processing Method]

Figure 5:
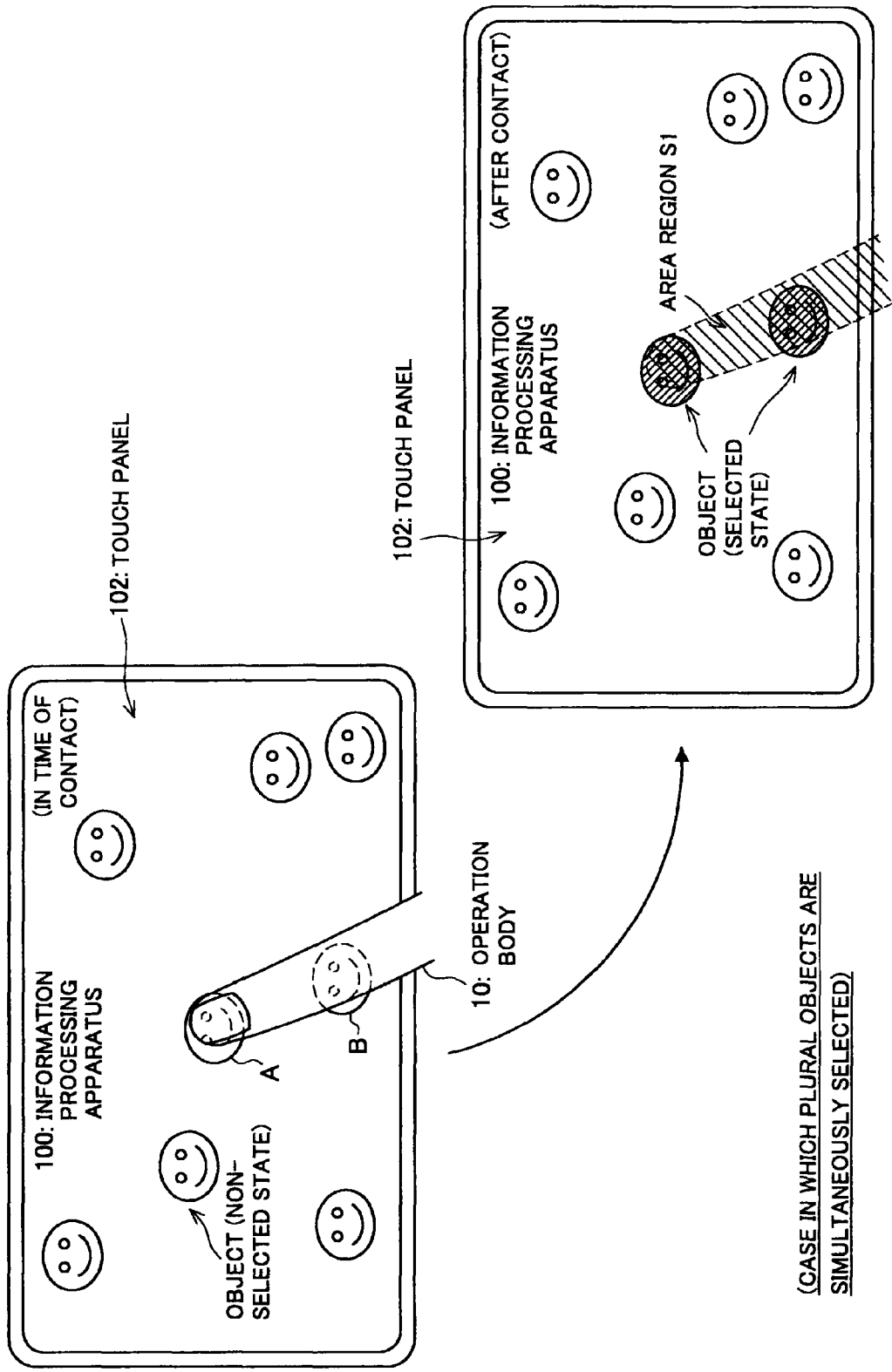
FIG. 5 shows one example of an information processing method according to one embodiment of the present invention.
Figure 6:
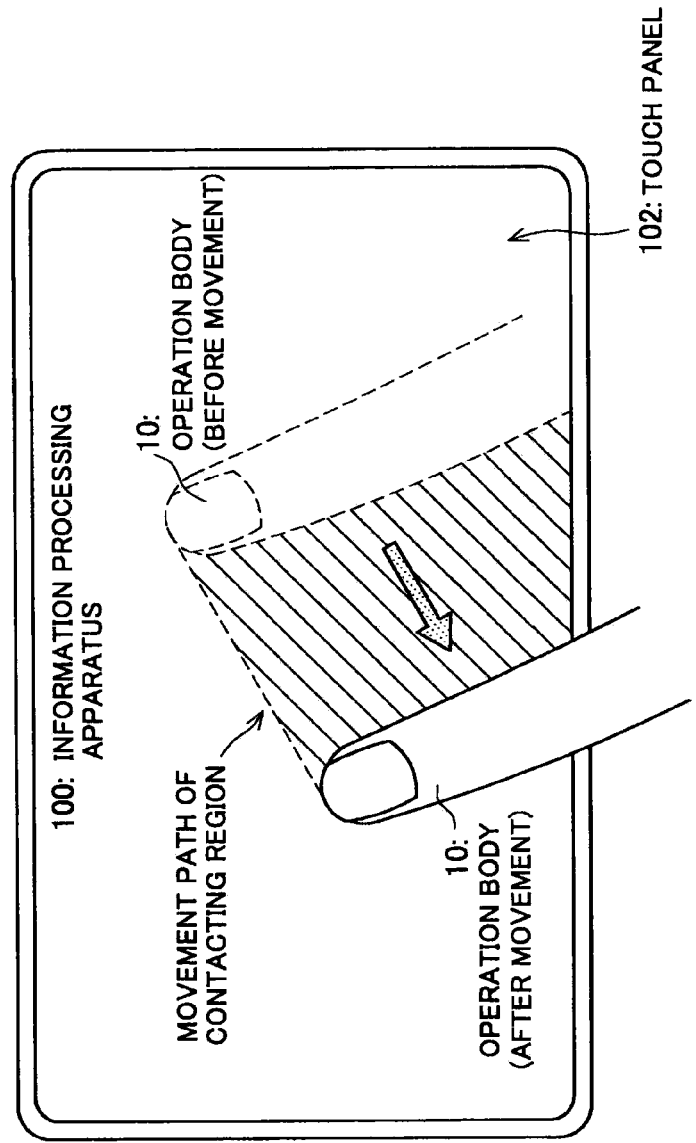
FIG. 6 shows one example of an information processing method according to one embodiment of the present invention.
Figure 7:
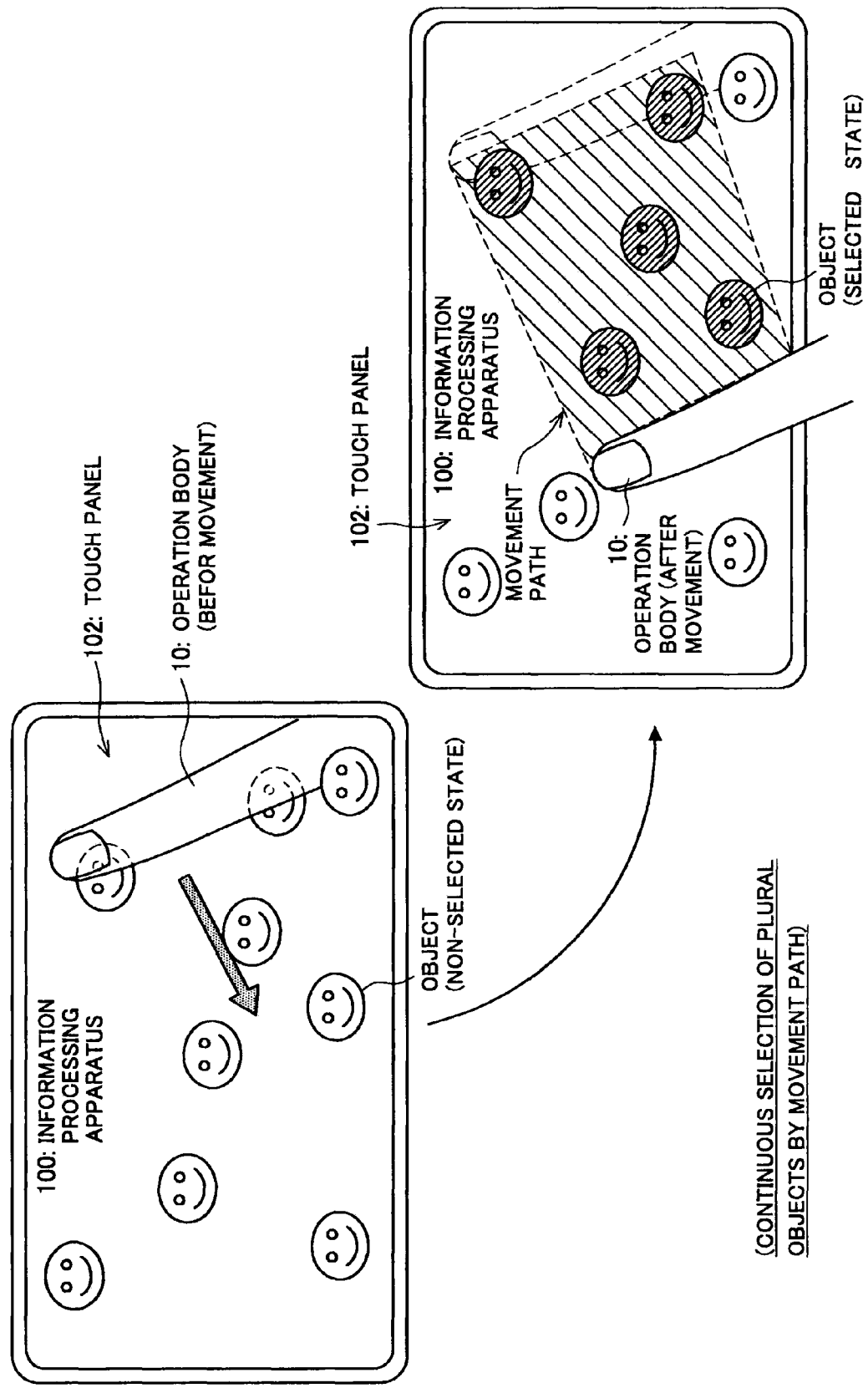
FIG. 7 shows one example of an information processing method according to one embodiment of the present invention.

The information processing method according to the present embodiment will now be described with reference to FIGS. 5 to 12. FIG. 5 is an explanatory view showing a state in which a plurality of objects is selected all at once by the area region corresponding to the operation body 10. FIG. 6 is an explanatory view showing one mode of the area region specified by the movement of the operation body 10. FIG. 7 is an explanatory view showing a state in which a great number of objects are selected all at once when the area region is specified.

Figure 8:
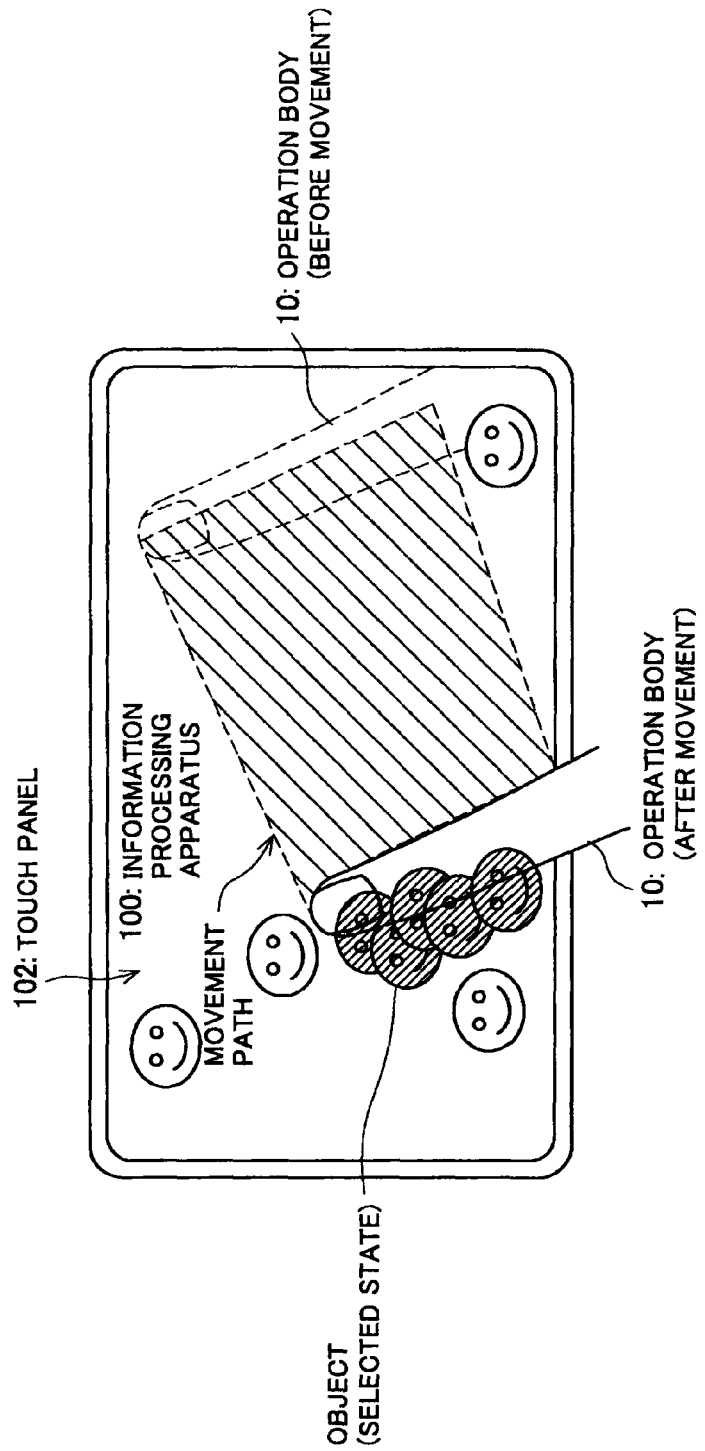
FIG. 8 shows one example of an information processing method according to one embodiment of the present invention.
Figure 9:
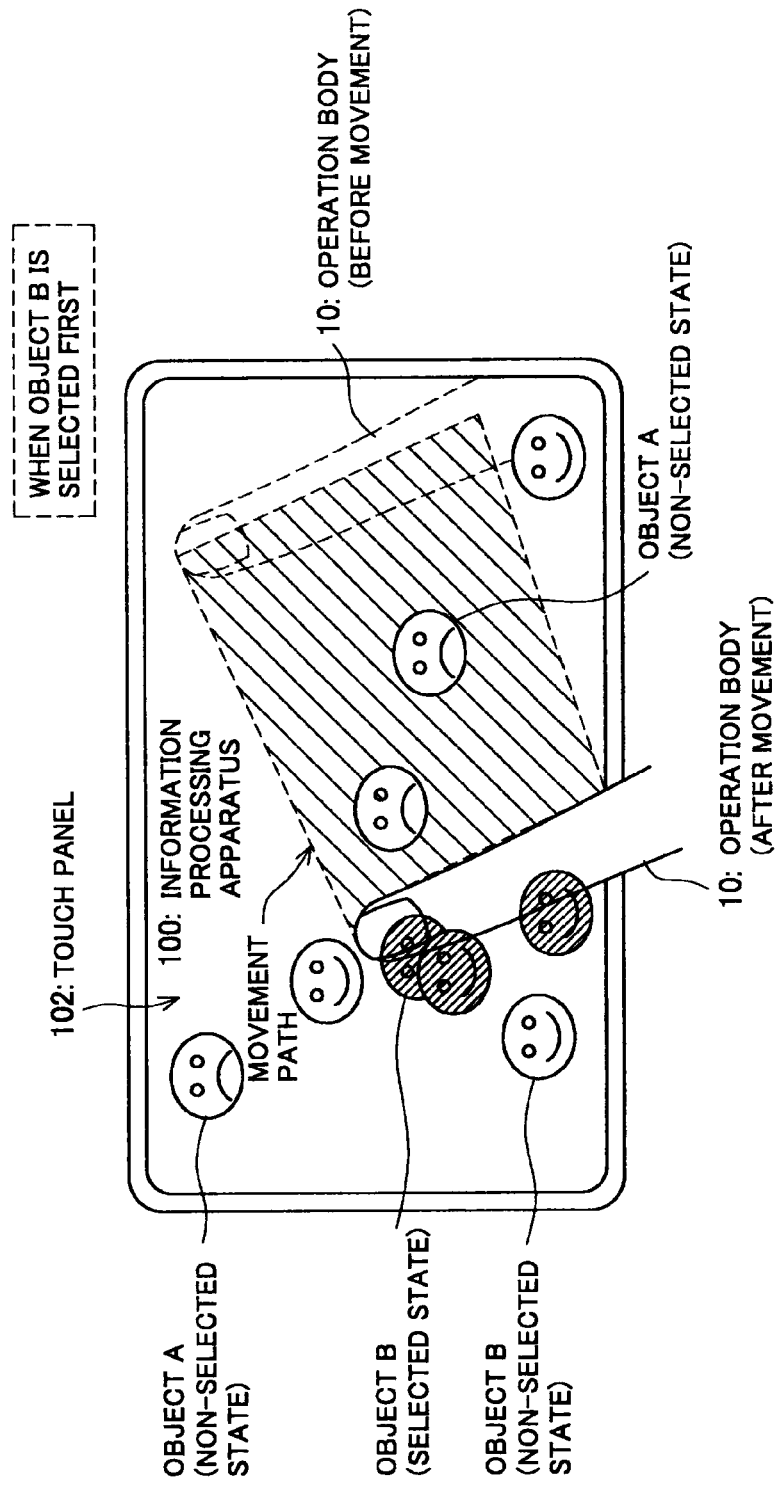
FIG. 9 shows one example of an information processing method according to one embodiment of the present invention.
Figure 10:
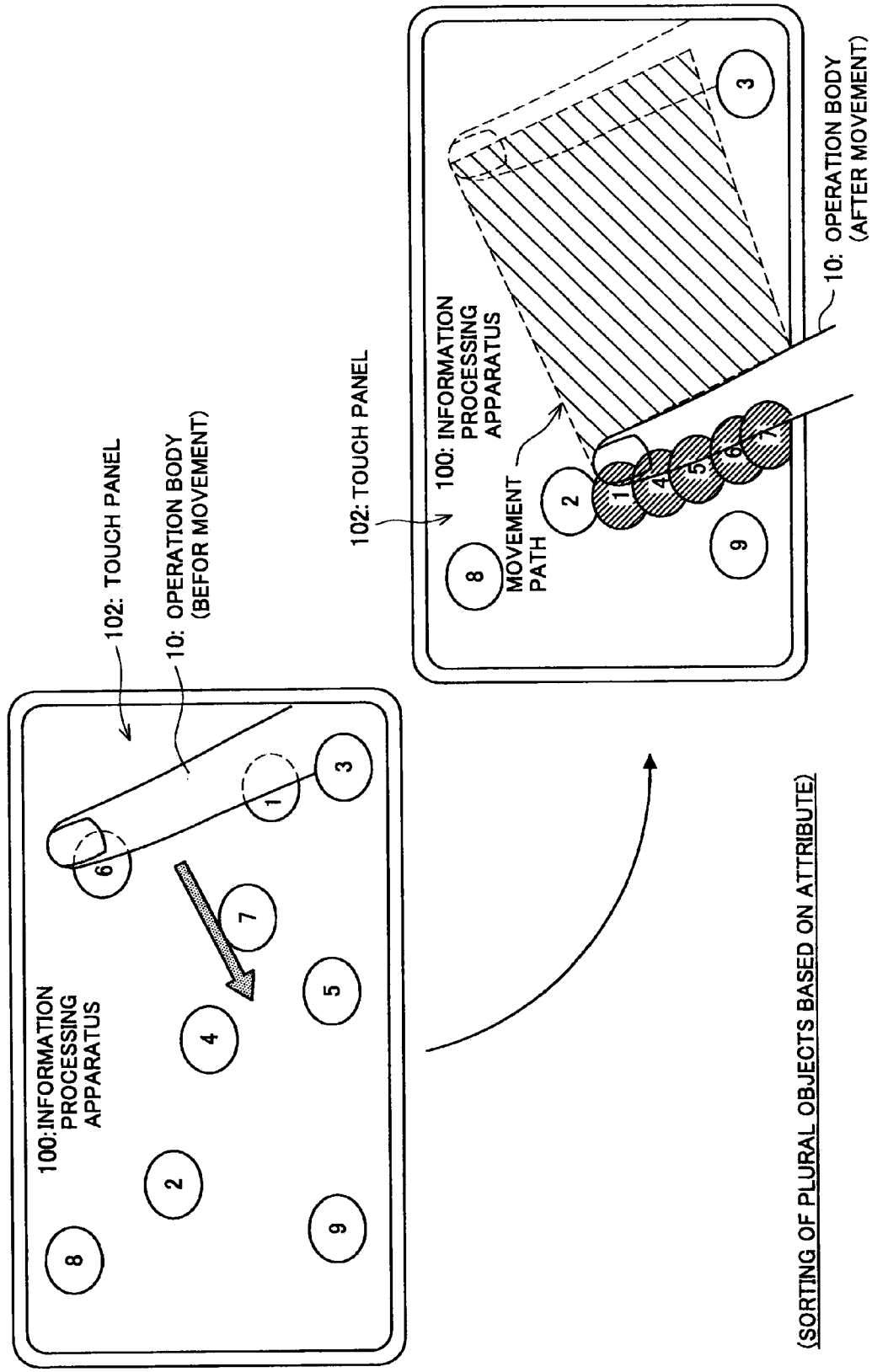
FIG. 10 shows one example of an information processing method according to one embodiment of the present invention.
Figure 11:
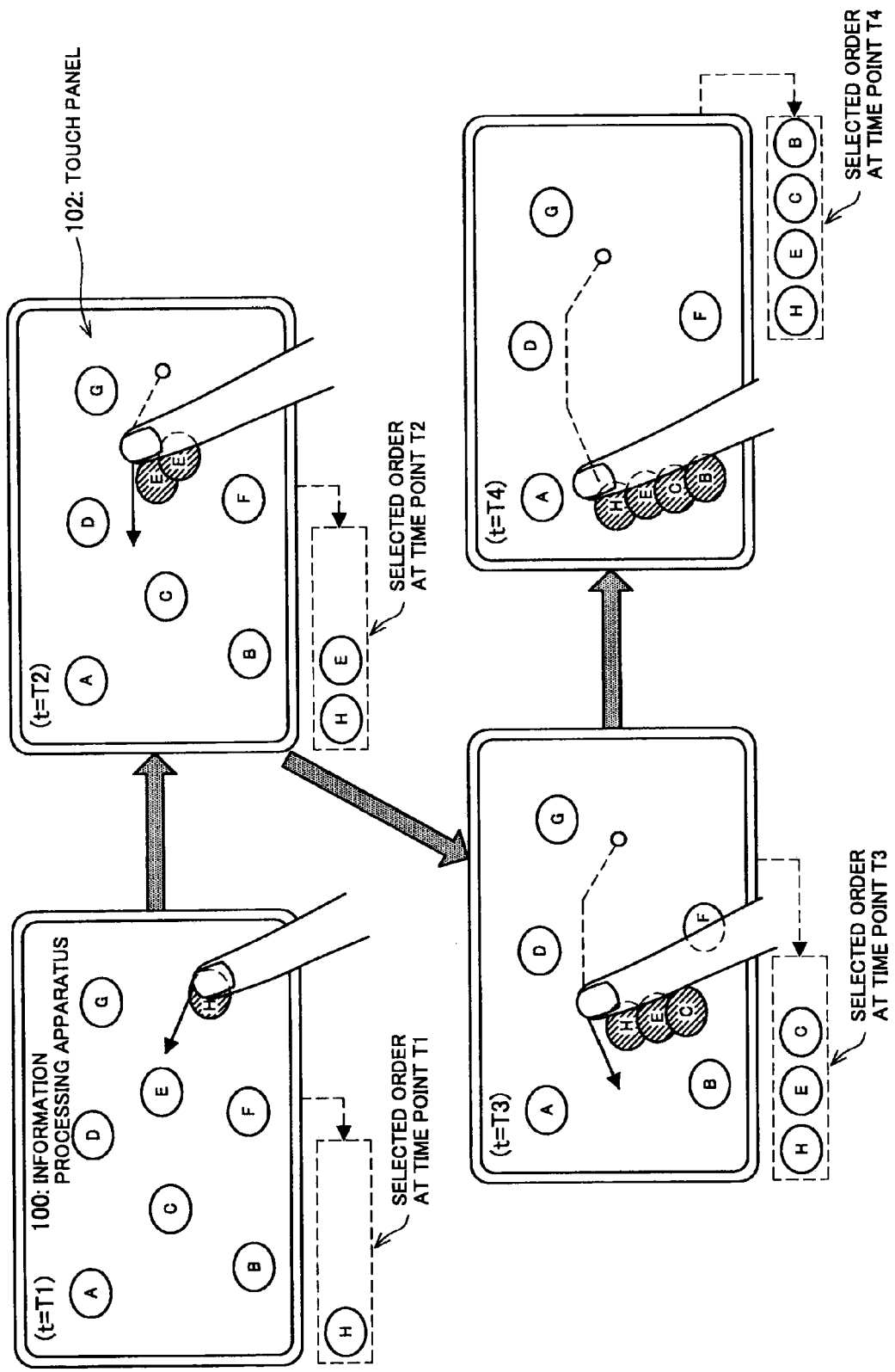
FIG. 11 shows one example of an information processing method according to one embodiment of the present invention.
Figure 12A:
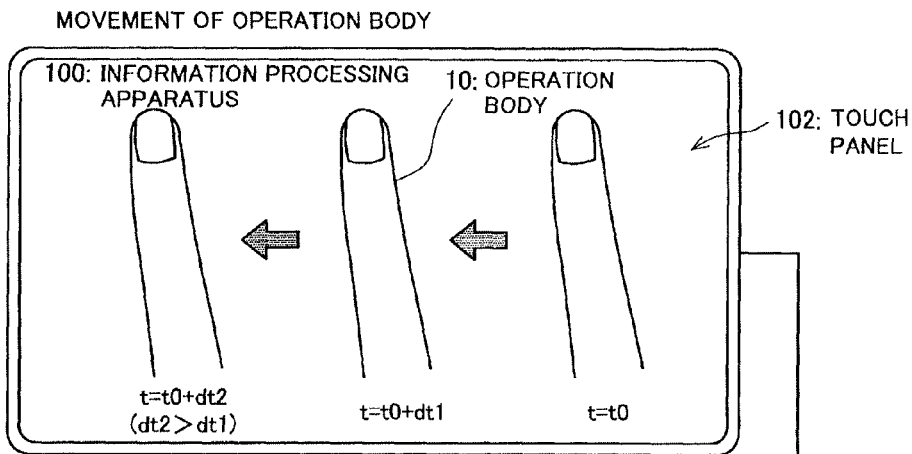
FIG. 12 shows one example of an information processing method according to one embodiment of the present invention.
Figure 12B:
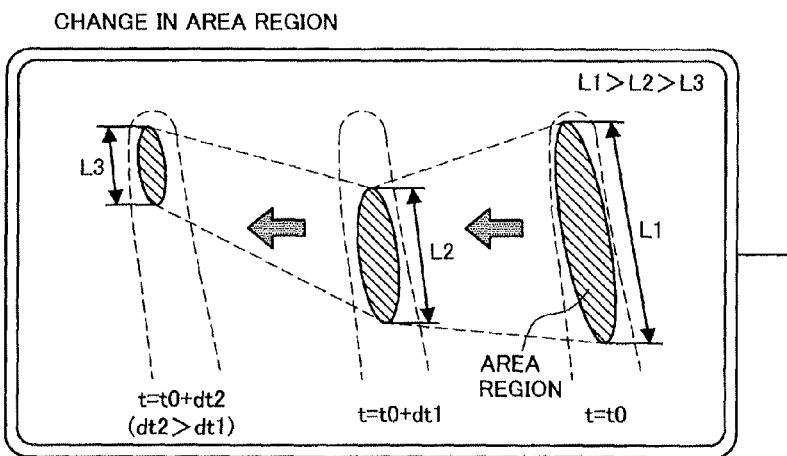
Figure 12C:
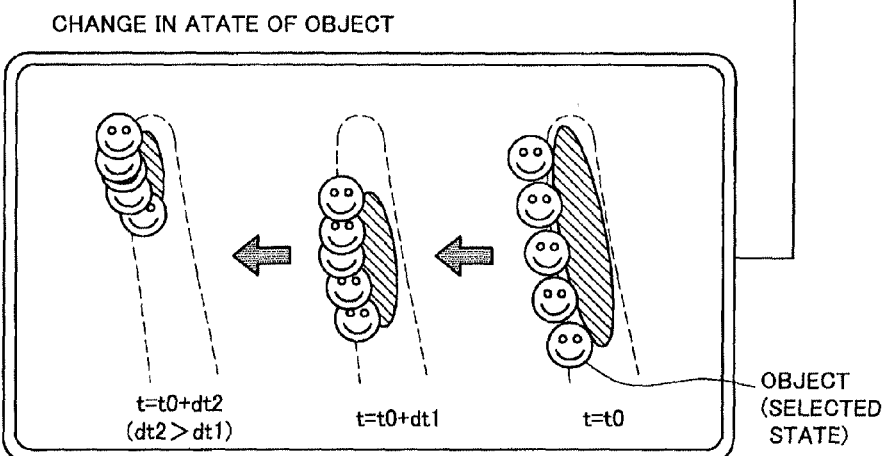

FIG. 8 is an explanatory view showing a state in which a plurality of objects is moved with the movement of the operation body 10. FIG. 9 is an explanatory view showing a state in which the object selected based on the attribute information of each object is moved. FIG. 10 is an explanatory view showing a state in which the objects are aligned based on the attribute information of each object. FIG. 11 is an explanatory view showing a state in which the objects are aligned based on the selected order of each object. FIG. 12 is an explanatory view showing a state in which the object is moved when the contacting area of the operation body 10 is changed.

(Regarding Simultaneous Selection Method of a Plurality of Objects)

First, reference is made to FIG. 5. As described above, the contacting portion of the operation body 10 is recognized as the area region in the information processing apparatus 100 according to the present embodiment. As shown in FIG. 5, if objects exist in the contacting portion when the operation body 10 is contacted to the touch panel 102, such objects transition from the non-selected state to the selected state. As described above, the touch panel 102 recognizes the contacting portion of the operation body 10 as an area region S1. In the example of FIG. 5, two objects are contacting the area region S1. Thus, the information processing apparatus 100 transitions the two objects contacting the area region S1 to the selected state.

As shown in FIG. 5, in the present embodiment, a plurality of objects can be simultaneously selected by one operation body 10 since the contacting portion of the operation body 10 is recognized as the area region. In the example of FIG. 5, the finger of the user is used as the operation body 10, but greater number of objects can be simultaneously selected if a hand of wider width and the like is used. For instance, all the objects displayed on the touch panel 102 can be simultaneously selected. The objects may be selected using a plurality of operation bodies 10. In this case, a plurality of objects can be simultaneously selected with each operation body 10.

(Regarding Movement Operation of the Operation Body 10)

FIG. 6 will now be referenced. In the example of FIG. 5, a configuration example in which a plurality of objects is selected at the stage of contacting the operation body 10 is shown. Greater number of objects can be set to the selected state all at once by moving the operation body 10 in the present embodiment. The movement operation of the operation body 10 will be described. As shown in FIG. 6, when the operation body 10 is moved, the information processing apparatus 100 can recognize the movement path of the contacting region from the movement information of the area region detected through the touch panel 102. In the example of FIG. 6, assumption is made that the front surface of the operation body 10 is contacting the touch panel 102.

The movement path of the contacting region detected through the touch panel 102 is recognized as a set of area regions detected in a predetermined period. If the predetermined period is a sufficiently short time, the movement path is recognized as a substantially continuous change in the area region. The information processing apparatus 100 may not hold the information indicating the movement path of the contacting region. For instance, the information processing apparatus 100 executes a predetermined process based on the information of the area region at the point the area region is detected, and discards the information of the area region after the process is completed. Therefore, the information of the area region (information of the movement path) corresponding to each time may not be held in the information processing apparatus 100.

As shown in FIG. 6, in the present embodiment, the contacting portion of the operation body 10 is sequentially recognized as the area region, and the information of the area region is sequentially updated when the operation body 10 is moved. Thus, the change of the area region corresponding to the operation body 10 is recognized at each moment during the movement of the operation body 10, and a predetermined process corresponding to the object is executed according to the change of the area region. As hereinafter described, the area and the shape of the area region corresponding to the contacting portion of the operation body 10 sequentially change. The processing content corresponding to the object may be changed according to the deformation and the like of the area region. For instance, if the area region changes from a certain predetermined shape to another predetermined shape, a predetermined process corresponding to such change in shape may be executed. Such configuration can be applied to the gesture input function.

(Regarding Selection Method of a Plurality of Objects by the Movement Path)

Reference is now made to FIG. 7. As illustrated in FIG. 6, when the operation body 10 is moved, the movement path is recognized as the continuous temporal change of the area region by the information processing apparatus 100. In the present embodiment, a method of selecting a plurality of objects all at once using the movement path recognized by the information processing apparatus 100 is provided. Consider a case where the operation body 10 is contacted to the touch panel 102 and moved in the contacted state, as shown in FIG. 7. A plurality of objects is displayed on the path on which the operation body 10 is moved.

In such case, the object contained in the movement path of the operation body 10 of the plurality of objects displayed on the touch panel 102 is transitioned to the selected state by the information processing apparatus 100. As described above, the information processing apparatus 100 compares the sequentially detected area region and the display position of the object, and sequentially transitions the object contacting the area region to the selected state. A great number of objects can be selected all at once regardless of the area to which the operation body 10 can contact by selecting the object in such manner. According to such method, the user can select a great number of objects without performing the operation of separating or again contacting the operation body 10 with respect to the touch panel 102 when selecting a great number of objects.

Many modifications are possible for the timing of transitioning the object to the selected state. A method of detecting the object contacting the area region and sequentially transitioning the object to the selected state every time the area region is detected is known. A method of detecting the object contacting the area region from the start to the stop of the movement of the operation body 10, and transitioning all the detected objects to the selected state at the stage the operation body 10 is stopped is also known. Furthermore, a method of transitioning the object to the selected state at the stage a predetermined time has elapsed from the start of the movement of the operation body 10 is also considered. Thus, although the determination process on whether or not to have the object in the selected state is substantially the same, the timing of transitioning the object to the selected state can be arbitrarily set.

The method of "selecting" the object has been described up to now. However, such method can also be applied to "unselecting". For instance, when the objects in the selected state are displayed on the touch panel 102, and such objects are included in the movement path, the information processing apparatus 100 transitions the objects from the selected state to the non-selected state. According to such configuration, the user can execute "un-selection" of the plurality of objects all at once. Thus, the user can "select" all the objects displayed on the touch panel 102 with the palm of the hand, and "unselect" some of the objects with the finger. As a result, the operation becomes very efficient when desiring to transition most of the objects displayed on the touch panel 102 to the selected state.

(Regarding Movement Process of a Plurality of Objects)

Reference is now made to FIG. 8. In the examples of FIGS. 5 to 7, the method of selecting the object has been mainly described. In the example of FIG. 8, the process of moving the selected plurality of objects will be descried. For instance, as shown in FIG. 8, assume that the operation body 10 is moved while contacting the touch panel 102, and that the movement path is detected by the information processing apparatus 100. In the example of FIG. 7, the objects included in the movement path are transitioned from the non-selected state to the selected state by the information processing apparatus 100. In the example of FIG. 8, the objects transitioned to the selected state are moved in accordance with the movement of the area region corresponding to the operation body 10.

When the operation body 10 is moved, the information processing apparatus 100 first sequentially detects the area region corresponding to the operation body 10. The information processing apparatus 100 checks the sequentially detected area region and the display position of the object displayed on the touch panel 102. In this case, if the display position of the object is included in the area region, the information processing apparatus 100 transitions the object from the non-selected state to the selected state. Furthermore, when the operation body 10 is moved, the information processing apparatus 100 moves the object transitioned to the selected state in accordance with the movement of the area region. For instance, the information processing apparatus 100 moves, with the contacting point of the area region and the display position of the object at the point the object is transitioned to the selected state as the reference, the object such that the contacting point moves in accordance with the movement of the area region.

In this case, a state in which the object moves following the operation body 10 is represented by representing the position of the contacting point with the position within the area region. The reference recognized as the position of the contacting point is arbitrarily set within the area region. For instance, the contacting point of the object and the area region may be set at the edge portion facing the advancing direction in the outer edge forming the area region. According to such setting, a state in which the objects transitioned to the selected state are accumulated at the side surface close to the advancing direction of the operation body 10 and the objects are gathered together is shown.

The operation performed using the touch panel 102 is similar to the operation of moving and gathering the objects on the actually existing desk. However, the object displayed on the touch panel 102 is part of the GUI, and it is hard for the user to directly feel the texture of the object. Devisal on enhancing the operation feeling of the user is desired by approaching the behavior of the object closer to the behavior of the actually existing object. From such reasons, devisal is made such that the objects behave so as to be gathered when the objects follow the moving operation body 10 in the present embodiment.

(Regarding Selective Movement Process of the Object Based on the Attribute)

Reference will now be made to FIG. 9. In the example of FIG. 8, the configuration in which all the objects included in the movement path of the operation body 10 are moved has been described. In the example of FIG. 9, a configuration of discriminating the object transitioned to the selected state based on the attribute information corresponded to each object, and moving only the object in the selected state is described. In the following description, the type of object is referenced as the attribute information for the sake of convenience of the explanation.

As shown in FIG. 9, two types of objects (object A, object B) are displayed on the touch panel 102. Before the movement of the operation body 10, all the objects are in the non-selected state. In this state, the operation body 10 is first contacted to the touch panel 102. The object B in the non-selected state is contacted to the area region corresponding to the operation body 10, and such object B is transitioned to the contacted state.

As described above, in the information processing apparatus 100, the object transitioned to the selected state can be discriminated by the attribute information (e.g., type of object) of the object first transitioned to the selected state. In the above example, the object B is first transitioned to the selected state, and thus only the object B is transitioned to the selected state. As shown in FIG. 9, even if both the object A and the object B are included in the movement path of the operation body 10, only the object B is transitioned to the selected state since the type of object transitioned to the selected state the first is the object B.

The object of the object A is maintained in the non-selected state. Thus, the objects of the object A are not moved regardless of the movement of the operation body 10. As a result, only the objects of the object B are gathered by the operation body 10. According to such configuration, the user can move only the objects of the desired type by selecting the objects of the desired type the first. Thus, the basic operation performed by the user is the same as the example of FIG. 8 even when discriminating the objects of the desired type. Therefore, the operation steps of the user do not increase even when selectively operating the objects.

(Regarding Sorting Process of Objects Based on the Attribute)

Reference will now be made to FIG. 10. In the example of FIG. 10, when a plurality of objects is gathered, the sorting process is executed based on the attribute information corresponded to each object. In the example of FIG. 10, the attribute information indicating a predetermined order is corresponded to each object. The created date and time, and the like of the execution data corresponding to each object is used for such attribute information. Here, assume the priorities (1, . . . , 9) are set to each object as the attribute information.

In the example of FIG. 10, five objects are contacted in order of priority (6, 1, 3, 7, 4, 5) in the moving process of the operation body 10. In this process, the objects are aligned according to the magnitude of the priority. For instance, at the point the two objects (priority 6, priority 1) contact the operation body 10, the objects are aligned in the order of the object of priority 1, and the object of priority 6. Similarly, at the point three objects (priority 6, priority 1, priority 3) contact the operation body 10, the objects are aligned in the order of the object of priority 1, the object of priority 3, and the object of priority 6.

Thus, in the moving process of the operation body 10, each object is transitioned to the selected state, and is aligned according to the priority every time. At the stage five objects are gathered, the objects are aligned in the order of priority 1, priority 4, priority 5, priority 6, and priority 7 (see FIG. 10). According to such configuration, the user does not pay attention to the order of gathering the objects or perform the operation of aligning after gathering. The operation illustrated in FIG. 10 is basically the same as the operation of the user in the example of FIG. 8. Therefore, the operation steps of the user do not increase even if the objects are aligned based on the attribute information.

(Regarding Sorting Process of Objects Based on the Selected Order)

Reference is now made to FIG. 11. In the example of FIG. 11, when a plurality of objects is gathered, the sorting process is executed based on the order each object is selected. FIG. 11 shows a state in which some of the objects of a plurality of objects (A to H) displayed on the screen are selected in order. T1 to T4 shown in the figure show the anteroposterior relation of time, and have a relationship of T1<T2<T3<T4. In the figure, the selected order at each time point (T1, T2, T3, T4) is shown.

As shown in FIG. 11, when selectively gathering some of the objects from a plurality of objects displayed on the screen, the gathered objects may be desirably sorted in the predetermined order. For instance, if there is a meaning in the lined order of the gathered objects, and the process after gathering differs depending on the lined order of the objects, the objects are desirably sorted in a predetermined order. A method of sorting the objects according to the attribute as in the example shown in FIG. 10 is also known, but the objects having a specific attribute may be desirably sorted when sorting the objects irrespective of the attribute.

By way of example, consider a case of reproducing the music in a predetermined order using the music reproduction application. In this case, the user selects the objects of the music album displayed on the screen in a predetermined order, and moves the objects to the specific processing region. As described above, a plurality of objects can be moved all at once to the specific display region by using the technique according to the present embodiment. The music reproduction application is configured such that the music album is reproduced in the order same as the lined order of the objects. When adopting such configuration, the significance of reproduction order arises in the lined order of the gathered objects.

As in the above example, if the lined order of the objects has significance, the user may want to efficiently sort the lined order of the objects to the desired lined order. For instance, in the reproduction application of music, video, and the like, the user may want to sort the lined order of the objects during the gathering operation so as to be the desired reproduction order, as in the example described above. If the lined order can be easily sorted, the user interface in which a predetermined application is activated according to the lined order of the objects may be considered as a practical operation means.

In the present embodiment, a method of controlling such that the lined order of the objects is automatically sorted in the process of the gathering operation as shown in FIG. 11 is proposed. The controlling method shown in FIG. 11 is mainly realized by the function of the object alignment unit 120 of the information processing apparatus 100. A method of sorting the lined order of the objects according to the example shown in FIG. 11 will be specifically described below.

FIG. 11 shows a state in which the object H is selected by the operation body 10 at the time point of t=T1. In this case, the object alignment unit 120 recognizes the object H as the first selected object. FIG. 11 shows a state in which the operation body 10 is moved while gripping the object H and selects the object E at the time point of t=T2.

In this case, the object E contacted at the position closer to the distal end of the operation body 10 than the object H is presumed to be positioned close to the distal end of the operation body 10 than the object H. However, in the present embodiment, the object E is recognized as the second selected object at the time point of t=T2, and the objects are sorted in the order selected by the object alignment unit 120. Thus, the objects are arranged so as to be lined in the order of objects H, E from the distal end side of the operation body 10.

Furthermore, FIG. 11 shows a state in which the operation body 10 moves while gripping the objects H, E, and selects the object C at the time point of t=T3. In this case as well, the object C is recognized as the third selected object at the time point of t=T3, similar to the process at the time point of t=T2, and the objects are sorted in the order selected by the object alignment unit 120. Thus, the objects are arranged to line in the order of objects H, E, and C from the distal end side of the operation body 10.

When the object B is further selected at the time point of t=T4, the object B is recognized as the fourth selected object, and the objects are sorted in the order selected by the object alignment unit 120. Thus, the objects are lined in the order of the objects H, E, C, and B from the distal end side of the operation body 10. When the objects H, E, C, and B are moved to the specific processing region in such state, a process corresponding to the lined order of the objects H, E, C, B is executed. For instance, the reproduction process of music is executed in the order of the music albums H→E→C→B.

As described above, the lined order of the objects desired by the user can be realized in a series of selecting operations by sorting the lined order of the objects based on the selected order. When using such method, the operation steps are not increased, and the sorting process is realized in the series of selecting operations. As a result, a very efficient operation body system can be realized by applying the method of the present embodiment in the processing system where different processes are executed depending on the lined order of the objects.

In other words, in addition to the operation information of "select/unselect", the new operation information of "lined order" can be input in the series of operation steps by using the method of the present embodiment. As the type of operation information that can be input increases without increasing the operation step, the type of process that can be executed with a series operations can be increased without complicating the operation body system. As a result, the convenience of the user enhances, and the attraction of the touch panel 102 as the input interface can be increased.

(Regarding Movement of the Objects Involved in Change of the Area Region)

FIG. 12 will now be referenced. FIG. 12 shows a state (A) in which the operation body 10 is moved, a state (B) in which the area region is changed, and a state (C) of the object that moves with the movement of the area region. In the examples shown in FIGS. 6 to 10, the shape of the area region is barely changed, and the movement of the object involved in the change in shape of the area region has not been discussed. Actually, however, the shape of the area region sometimes greatly changes according to the pressing degree, and the like of the operation body 10 contacting the touch panel 102.

For instance, consider a case in which the operation body 10 is sled from the right side of the screen to the left side of the screen with elapse of time, as shown in (A) of FIG. 12. (A) of FIG. 12 shows the position of the operation body 10 at time t=t0, time t=t0+dt1 (dt1>0), and time t=t0+dt2 (dt2>dt1). In this case, the shape of the area region corresponding to the contacting portion of the operation body 10 changes as shown in (B) of FIG. 12. In this example, the area region reduces with elapse of time. The length in the longitudinal direction of the area region is L1 at the time point of time t=t0. At the time point of time t=t0+dt1, the length in the longitudinal direction of the area region reduces to L2 (<L1). Furthermore, at the time point of time t=t0+dt2, the length in the longitudinal direction of the area region reduces to L3 (<L2). The position of the area region also sometimes changes.

When the area region is reduced in such manner, the width of the area region the object contacts also reduces. If the object is completely contacted to the outer edge of the area region along the longitudinal direction at the time point of time t=t0, the object may move away from the area region at the time point of time t=t0+dt1 or time t=t0+dt2. The movement of the object following the movement of the portion the operation body 10 is not contacting the touch panel 102 may give an uncomfortable feeling to the user. Thus, in the present embodiment, the position of the object is moved during the movement of the operation body 10 such that the object transitioned to the selected state by contacting the area region is typically in a state contacting the area region.

Assume five objects are completely contacting the area region at the time point of t=t0, as shown in (C) of FIG. 12. If the area region is reduced in such state, some of the objects move away from the area region. Thus, as shown in (C) of FIG. 12, the positions of the objects are adjusted such that the five objects are in a state contacting the area region of reduced state at time t=t+dt1 or time t=t+dt2. For instance, the five objects are arranged closer to the center of the area region and are moved such that all objects are in a state at least contacting the outer edge of the area region.

When the shape of the area region is changed from the state corresponding to time t=d+dt2 to the state corresponding to time t=tO in (C) of FIG. 12, the area region enlarges. If the area region enlarges, the object contacting the area region before enlargement is maintained in a state contacting the area region even after the enlargement. Thus, the risk of the objects moving away from the area region as when the area region is reduced does not arise. However, unbalance occurs if the objects are not moved when the area region is enlarged as opposed to when the objects are moved when the area region is reduced. The user normally predicts symmetric property of the operation result with respect to the symmetric operation. That is, with respect to the symmetric "operation" of enlargement/reduction of the area region, the user may feel an uncomfortable feeling to the phenomenon that the object moves in one case and the object does not move in the other case.

From such standpoint, in the present embodiment, the object may be evenly spread along the outer edge of the enlarged area region when the area region is enlarged. According to such configuration, the user can aggregate or diffuse the positions of a plurality of objects by performing the "operation" of enlarging/reducing the area region. The following conveniences are achieved by realizing the operations of aggregation and diffusion.

First, "aggregation" will be described using an example. When displaying the picture data, the operation of dragging the object (icon etc.) corresponding to the picture data to the object (shortcut icon etc.) corresponding to the picture display application is performed. Since a plurality of objects can be simultaneously moved by using the operation body system realized by the configuration of the present embodiment, a plurality of picture data can be dragged in the selected state. However, the object of the picture display application to which the plurality of objects is dragged is one. Thus, all the objects corresponding to the picture data are dragged to the region displaying the one object.

In this case, if the plurality of objects corresponding to the picture data is aggregated in a small region, the objects can be easily dragged to the object of the picture display application. In particular, all the objects of the picture data can be dragged by moving the distal end of the operation body 10 to the object of the picture display application by having the user reduce the size of the area region while moving the area region to the distal end of the operation body 10. That is, when gathering the plurality of objects, even the aggregation process of the plurality of objects can be executed during the gathering operation by using the operation body system according to the present embodiment. As a result, the convenience of the operation body system using the touch panel 102, where intuitive operations by drag-and-drop are often used, can be significantly enhanced.

Now, "diffusion" will be described using an example. As described above, the shape of the area region can be changed by changing the contacting state of the operation body 10, and a plurality of objects can be aggregated to one point through the application of the configuration of the present embodiment. However, it is very difficult to discriminate some of the objects from the plurality of objects aggregated in a small area region. Furthermore, if a plurality of objects is overlapped in the gathering stage, the object hidden under another object becomes difficult to select. In such case, the desired object can be easily selected by changing the contacting state of the operation body 10 to enlarge the area region and diffuse the objects that are aggregated or overlapped along the area region.

The object transitioned to the selected state by contacting the area region at a certain time point is moved so as to be in a state contacted to the area region even if the shape of the area region is changed. According to such configuration, the user can aggregate or spread the position of the object in the selected state by adjusting the pressing degree of the operation body 10 or lifting part of the operation body 10 from the touch panel 102. The spacing between the objects may be equal when aggregating or diffusing the plurality of objects. Furthermore, the objects may be evenly arranged along the outer edge of the area region when diffused after once being aggregated. The selecting operation of the objects is more facilitated by such configuration.

[Hardware Configuration]

Figure 13:
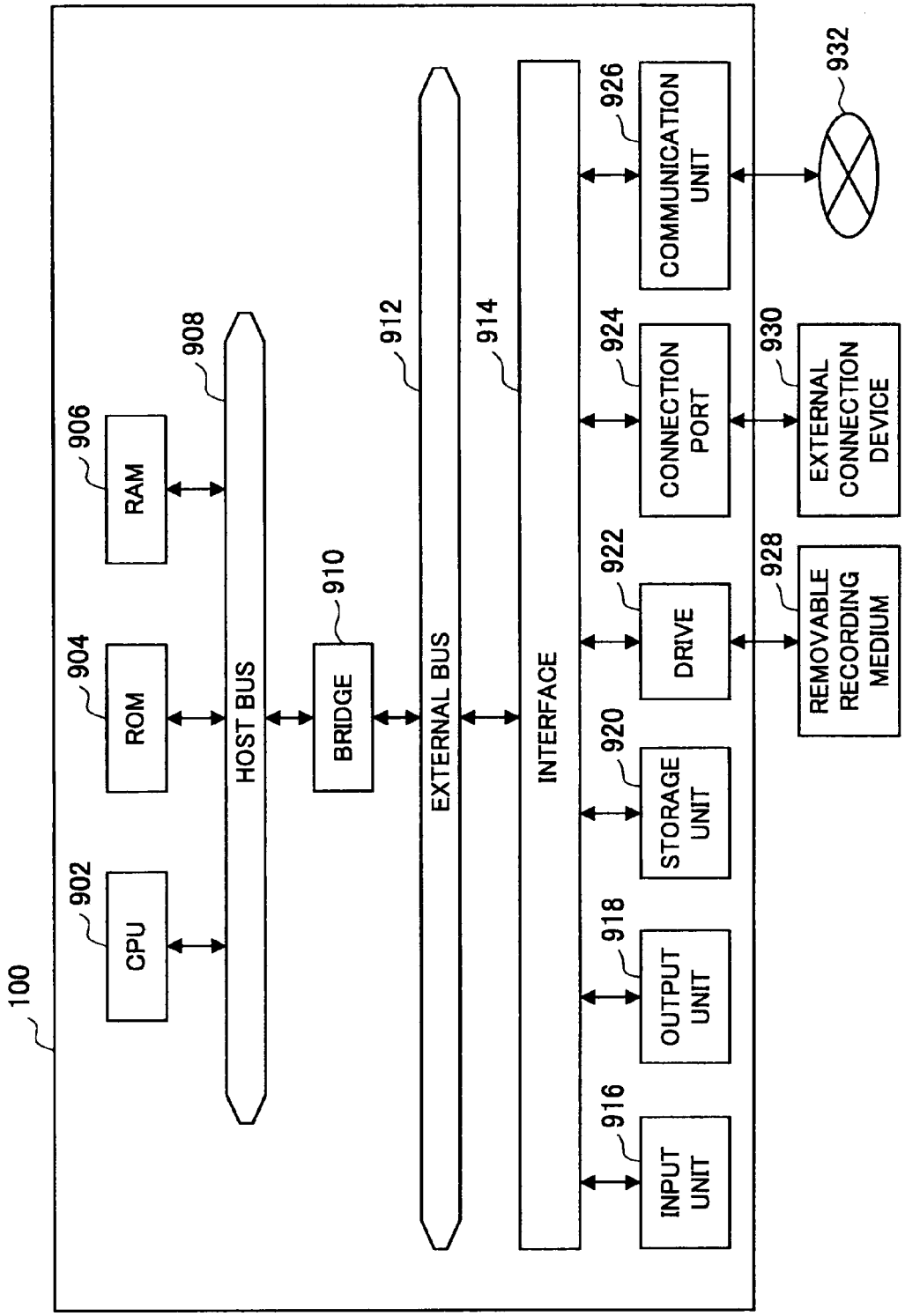
FIG. 13 shows a hardware configuration example of the information processing apparatus according to one embodiment of the present invention.

The functions of the constituent elements held by the device can be realized by an information processing apparatus having, for example, a hardware configuration shown in FIG. 13. FIG. 13 is a diagram for explaining a hardware configuration of an information processing apparatus which can realize the functions held by the constituent elements of the apparatus.

As shown in FIG. 13, the information processing apparatus mainly includes a CPU (Central Processing Unit) 902, a ROM (Read Only Memory) 904, a RAM (Random Access Memory) 906, a Host bus 908, a bridge 910, an external bus 912, an interface 914, an input unit 916, an output unit 918, a storage unit 920, a drive 922, a connection port 924, and a communication unit 926.

The CPU 902 functions as an arithmetic processing unit or a control unit and controls an entire operation of the constituent elements or some of the constituent elements on the basis of various programs recorded on the ROM 904, the RAM 906, the storage unit 920, or the removal recording medium 928. The ROM 904 stores, for example, a program loaded on the CPU 902 or data or the like used in an arithmetic operation. The RAM 906 temporarily or perpetually stores, for example, a program loaded on the CPU 902 or various parameters or the like arbitrarily changed in execution of the program. These constituent elements are connected to each other by, for example, the host bus 908 which can perform high-speed data transmission. The host bus 908, for example, is connected to the external bus 912 in which a data transmission speed is relatively low through the bridge 910.

The input unit 916 is, for example, an operation unit such as a mouse, a keyboard, a touch panel, button, a switch, or a lever. The input unit 916 may be a remote control unit (so-called remote) that can transmit a control signal by using an infrared ray or other radio waves. The input unit 916 includes an input control circuit or the like to transmit information input by using the operation unit to the CPU 902 through an input signal.

The output unit 918 is, for example, a display device such as a CRT (Cathode Ray Tube), an LCD (Liquid Crystal Display), a PDP (Plasma Display Panel), or an ELD (Electro-Luminescence Display), an audio output device such as a loudspeaker or headphones, a printer, a mobile phone, or a facsimile that can visually or auditorily notify a user of acquired information.

The storage unit 920 is a device to store various data, and includes, for example, a magnetic storage device such as a hard disk drive (HDD; Hard Disk Drive), a semiconductor storage device, an optical storage device, or a magnetooptical storage device, or the like.

The drive 922 is a device that reads information recorded on the removal recording medium 928 such as a magnetic disk, an optical disk, a magnetooptical disk, or a semiconductor memory or writes information in the removal recording medium 928. The removal recording medium 928 is, for example, a DVD medium, a Blue-ray medium, an HD-DVD medium, a compact flash (CF; compactFlash) (registered trademark), a memorystick, or an SD memory card (Secure Digital memory card), or the like. As a matter of course, the removal recording medium 928 may be, for example, an IC card (Integrated Circuit Card) on which a non-contact IC chip is mounted, an electronic device, or the like.

The connection port 924 is a port such as an USB (Universal Serial Bus) port, an IEEE1394 port, an SCSI (Small Computer System Interface), an RS-232C port, or an optical audio terminal to which the external connection device 930 is connected. The external connection device 930 is, for example, a printer, a mobile music player, a digital camera, a digital video camera, an IC recorder, or the like.

The communication unit 926 is a communication device to be connected to a network 932. For example, a communication card for a wired or wireless LAN (Local Area Network), Bluetooth (registered trademark), or WUSB (Wireless USB), an optical communication router, an ADSL (Asymmetric Digital Subscriber Line) router, various communication modems, or the like is used. The network 932 connected to the communication unit 926 includes a wiredly or wirelessly connected network. For example, the Internet, a home-use LAN, infrared communication, broadcasting, satellite communication, or the like is used.

[Summary]

Lastly, the function configuration of the information processing apparatus of the present embodiment and the effects obtained by such function configuration will be briefly summarized.

First, the function configuration of the information processing apparatus according to the present embodiment can be expressed as below. The information processing apparatus includes a display panel, an area region detection unit, a contacting object detection unit, and an object selection unit. The touch panel 102 is an example of the display panel.

The display panel displays a plurality of objects. The area region detection unit detects the operation body positioned on the display panel, and detects the area region on the display panel corresponding to the operation body. Thus, the position of the operation body is recognized as the area region instead of the coordinate of one point in the information processing apparatus. Furthermore, the contacting object detection unit detects one or a plurality of objects contacting the area region detected by the area region detection unit.

Since the contacting portion (or the proximate portion) of the operation body is recognized as the area region, the plurality of objects can be detected even when the plurality of objects are contacted. The object selection unit sets some or all of the objects detected by the contacting object detection unit to the selected state. As described above, the contacting state of the plurality of objects with respect to the area region can be detected, and thus the objects can be all or selectively set to the selected state.

The information processing apparatus may also include an object movement unit for moving the object set to the selected state by the object selection unit in accordance with the movement of the area region corresponding to the operation body when the operation body is moved. The display control unit 112 is an example of the object movement unit. The user can gather a plurality of objects as the objects move so as to follow the operation body. Such operation is very useful when moving a plurality of objects to a predetermined region. In particular, an operation body system of very high convenience when moving a great number of objects to a small region can be provided.

The contacting object detection unit may be configured to detect the object contacted to the area region during the movement of the operation body. In this case, the object selection unit sets the object detected by the contacting object detection unit to the selected state during the movement of the operation body. Thus, as the object is sequentially transitioned to the selected state while moving the operation body, the objects can be gathered while transitioning the object in the non-selected state to the selected state.

The object selection unit may be configured to have only the object having the same attribute as the object detected the first by the contacting object detection unit to the selected state of the objects detected by the contacting object detection unit. The user can select the object in the series of gathering operations without performing a special setting operation by setting the discriminating condition of the object to have in the selected state in the attribute of the object selected "the first".

The information processing apparatus may also include an object alignment unit for aligning the objects selected by the object selection unit according to the order indicated by the attribute when the attribute indicating a predetermined order is given to the object. Furthermore, the order of a plurality of objects may be updated and a plurality of objects may be realigned every time a new object is transitioned to the selected state. According to such configuration, the user does not realign the objects after gathering the plurality of objects.

Since the gathered objects are aligned according to a predetermined attribute, the desired object can be easily identified. For instance, when desiring to have only a small number of objects of a predetermined type in the non-selected state out of a great number of objects, the great number of objects are gathered and set to the selected state, and then only a small number of objects of the predetermined type can be easily changed to the non-selected state.

The area region detection unit may be configured to represent the area region with the coordinate of one point if the size of the area region corresponding to the operation body is smaller than a predetermined value. Although the operation body system by the area region is very useful, as described above, the user may want to specify and operate the coordinate of one point. In this case, the user adjusts the contacting degree (or proximate degree) of the operation body and narrows the area region to smaller than a predetermined value through the configuration described above so that the coordinate of one point can be specified and operated. According to such configuration, compatibility can be provided to the application and the like that operates using the coordinate of one point.

The area region detection unit may be configured to detect one or a plurality of area regions corresponding to a plurality of operation bodies by detecting the plurality of operation bodies positioned on the display panel. According to such configuration, the operation body system using the area region corresponding to the plurality of operation bodies can be built. If the area regions corresponding to the plurality of operation bodies are continuous, such continuous area regions may be handled as one area region. In this case as well, the plurality of objects can be operated with respect to each operation body, and thus the operation body system having high convenience can be realized, similar to above.

The object movement unit may be configured to move the object such that, when the shape of the area region is changed during the movement of the operation body, the contacting state of the object is maintained to the area region of after the change. According to such configuration, the object contacting the area region at first can be prevented from moving away from the area region due to change in size and shape of the area region. The positions of the plurality of objects can be aggregated or diffused by having the user "operate" the size and the shape of the area region.

The information processing apparatus may further include an object alignment unit for aligning the objects selected by the object selection unit according to the order selected by the object selection unit. Thus, since the objects are aligned according to the selected order, the objects can be aligned to the desired lined order during the series of selecting operations. As a result, the operability of the user can greatly enhance when using the application in which different processes are executed depending on the lined order of the objects. Furthermore, the application for realizing a variety of processes by actively using the "lined order" can be more easily accepted by the user since the additional operation information of "lined order" of the objects can be easily input.

It should be understood by those skilled in the art that various modifications, combinations, sub-combinations and alterations may occur depending on design and other factors insofar as they are within the scope of the appended claims or the equivalents thereof.

The present application contains subjected matter related to that disclosed in Japanese Priority Patent Application JP 2008-234424 filed in the Japan Patent Office on Sep. 12, 2008, the entire contents of which is hereby incorporated by reference.

What is claimed is:

1. An information processing apparatus comprising:
a display panel for displaying a plurality of objects;
an area region detection unit for detecting an operation body positioned on the display panel, and detecting an area region of the display panel corresponding to the operation body, the detection of the area region being based on shade data obtained from a shade of the operation body projected onto the display panel;
a contacting object detection unit for detecting one or more objects contacting the area region detected by the area region detection unit; and
an object selection unit for setting one or more of the objects detected by the contacting object detection unit to a selected state.

2. The information processing apparatus according to claim 1, further comprising an object movement unit for moving the one or more objects set to the selected state by the object selection unit in accordance with a movement of the area region corresponding to the operation body, when the operation body is moved.

3. The information processing apparatus according to claim 2, wherein
the contacting object detection unit detects the one or more objects contacting the area region during movement of the operation body, and
the object selection unit sets the one or more objects detected by the contacting object detection unit during the movement of the operation body to the selected state.

4. The information processing apparatus according to claim 3, wherein the object selection unit sets to the selected state, only an object having the same attribute as an attribute of an object detected first by the contacting object detection unit.

5. The information processing apparatus according to claim 3, further comprising an object alignment unit for aligning the one or more objects selected by the object selection unit according to the order indicated by an attribute indicating a predetermined order, when the attribute is associated with an object having the same attribute as the attribute of the first object detected by the contacting object detection unit.

6. The information processing apparatus according to claim 1, wherein the area region detection unit represents the area region with a coordinate of one point when a size of the area region corresponding to the operation body is smaller than a predetermined value.

7. The information processing apparatus according to claim 2, wherein the area region detection unit detects a plurality of operation bodies positioned on the display panel, and detects one or more area regions corresponding to the plurality of operation bodies.

8. The information processing apparatus according to claim 2, wherein the object movement unit moves the one or more objects, when a shape of the detected area region is changed during the movement of the operation body, such that contacting states of the one or more objects are maintained in the area region after the change.

9. The information processing apparatus according to claim 3, further comprising an object alignment unit for aligning objects selected by the object selection unit according to an order selected by the object selection unit.

10. The information processing apparatus of claim 2, wherein an application corresponding to a relevant gesture is activated when the operation body is moved such that a predetermined path is traced while the operation body has contact with the display panel.

11. The method of claim 1, wherein the shade data comprises a shape, and a set of coordinates for which an outside light luminance is lower than a predetermined value due to the shade of the operation body.

12. The information processing apparatus of claim 1, wherein the operation body comprises a user's finger, a stylus, a touch pen, and a brush.

13. An information processing method comprising the steps of:
   displaying a plurality of objects on a display panel;
   detecting an operation body positioned on the display panel, and an area region of the display panel corresponding to the operation body, the detection of the area region being based on shade data obtained from a shade of the operation body projected onto the display panel;
   detecting one or more objects contacting the area region detected in the area region detection step; and
   setting one or more of the objects detected in the contact object detection step to a selected state.

14. The method according to claim 13, further comprising the step of:
   moving the one or more objects set to the selected state in accordance with movement of an area region corresponding to the operation body, when the operation body is moved.

15. The method according to claim 14, wherein
   the one or more objects contacting the area region are detected during the movement of the operation body, and
   the one or more objects detected during the movement of the operation body are set to the selected state.

16. The method according to claim 15, wherein only an object having the same attribute as the object detected first by the contacting object detection step is set to the selected state.

17. The method according to claim 15, further comprising an object alignment step for aligning the one or more objects selected by the object setting step according to the order indicated by an attribute indicating a predetermined order, when the attribute is associated with an object having the same attribute as the attribute of the first object detected by the contacting object detection step.

18. The method according to claim 13, wherein the area region detection step represents the area region with a coordinate of one point when a size of the area region corresponding to the operation body is smaller than a predetermined value.

19. The method according to claim 14, wherein the area region detection step detects a plurality of operation bodies positioned on the display panel, and detects one or more area regions corresponding to the plurality of operation bodies.

20. The method according to claim 14, wherein the object movement step involves moving the one or more objects, when a shape of the detected area region is changed during the movement of the operation body, such that contacting states of the one or more objects are maintained in the area region after the change.

21. The method according to claim 13, wherein the shade data comprises a shape, and a set of coordinates for which an outside light luminance is lower than a predetermined value due to the shade of the operation body.

22. A computer readable non-transitory recording medium having executable instructions stored thereon, the executable instructions causing a computer to perform steps for providing a user authentication function, the steps comprising:
   displaying a plurality of objects on a display panel;
   detecting an operation body positioned on the display panel and an area region of the display panel corresponding to the operation body, the detection of the area region being based on shade data obtained from a shade of the operation body projected onto the display panel;
   detecting one or more objects contacting the area region detected in the area region detection step; and
   setting one or more of the objects detected in the contact object detection step to a selected state.

23. The recording medium according to claim 22, wherein the steps further comprise the step of:
   moving the one or more objects set to the selected state in accordance with movement of an area region corresponding to the operation body, when the operation body is moved.

24. The recording medium according to claim 22, wherein the shade data comprises a shape, and a set of coordinates for which an outside light luminance is lower than a predetermined value due to the shade of the operation body.

25. The method of claim 23, wherein an application corresponding to a relevant gesture is activated when the operation body is moved such that a predetermined path is traced while the operation body has contact with the display panel.

* * * * *